US010143018B2

(12) United States Patent
Sheriff et al.

(10) Patent No.: US 10,143,018 B2
(45) Date of Patent: Nov. 27, 2018

(54) COMPUTING DEVICE WITH WIRELESS NETWORK SELECTION FEATURE

(71) Applicant: Google Inc., Mountain View, CA (US)

(72) Inventors: Irfan Sheriff, Fremont, CA (US);
Thomas G. O'Neill, Mountain View, CA (US)

(73) Assignee: Google LLC, Mountain View, CA (US)

(*) Notice: Subject to any disclaimer, the term of this patent is extended or adjusted under 35 U.S.C. 154(b) by 466 days.

(21) Appl. No.: 13/857,301

(22) Filed: Apr. 5, 2013

(65) Prior Publication Data

US 2014/0003342 A1    Jan. 2, 2014

Related U.S. Application Data

(60) Provisional application No. 61/791,096, filed on Mar. 15, 2013, provisional application No. 61/708,842, (Continued)

(51) Int. Cl.
*H04W 76/10* (2018.01)
*H04W 36/24* (2009.01)

(52) U.S. Cl.
CPC .......... *H04W 76/10* (2018.02); *H04W 36/24* (2013.01)

(58) Field of Classification Search
CPC ..... H04W 76/02; H04W 36/24; H04W 48/18; H04W 36/0083; H04W 36/30; H04W 88/02; H04W 36/0066; H04W 76/10
(Continued)

(56) References Cited

U.S. PATENT DOCUMENTS 6,381,315 B1    4/2002    Nhaissi
7,180,898 B2    2/2007    Yoshida et al.
(Continued)

FOREIGN PATENT DOCUMENTS

EP    1206069 A1    5/2002
EP    1885144 A2    2/2008
(Continued)

OTHER PUBLICATIONS

Bircher et al., "An Agent-Based Architecture for Service Discovery and Negotiation in Wireless Networks," University of Bern, Wired/Wireless Internet Comms. (WWIC), Jan. 21, 2004.
(Continued)

*Primary Examiner* — Kwang B Yao
*Assistant Examiner* — Ricardo Castaneyra
(74) *Attorney, Agent, or Firm* — Faegre Baker Daniels LLP

(57) ABSTRACT

In one implementation, a computer-implemented method includes transmitting data over a first wireless connection with a first wireless access point; detecting, by the computing device, a wireless signal from a second wireless access point; accessing, for an account that is associated with a data service, information that identifies a portion of a budget for the account that has already been spent, wherein the budget identifies an amount of data that is available for transmission over a period of time in association with the account; determining whether the account currently has a budget deficit based on a comparison of i) the portion of the budget that has been spent and ii) a usage pattern; determining whether to switch to a second wireless connection with the second wireless access point; and establishing the second wireless connection as a result of the determining.

23 Claims, 12 Drawing Sheets

Related U.S. Application Data filed on Oct. 2, 2012, provisional application No. 61/690,567, filed on Jun. 27, 2012.

(58) Field of Classification Search
USPC .... 370/328, 331, 332, 310, 310.2, 338, 252, 370/230, 465, 329, 395.21, 395.41, 254, 370/232, 235; 455/432.1
See application file for complete search history.

(56) References Cited

U.S. PATENT DOCUMENTS

| | | | |
|---|---|---|---|
| 7,433,929 | B2 | 10/2008 | Guilford et al. |
| 7,512,379 | B2 | 3/2009 | Nguyen |
| 7,809,360 | B2 | 10/2010 | Agrawal et al. |
| 8,116,285 | B1 | 2/2012 | Barnum |
| 8,406,197 | B2 | 3/2013 | Lai |
| 8,391,192 | B2 | 5/2013 | Prakash et al. |
| 8,484,568 | B2 | 7/2013 | Rados et al. |
| 8,571,560 | B1 | 10/2013 | Sankaranaraynan et al. |
| 8,590,023 | B2 | 11/2013 | Gupta et al. |
| 8,767,695 | B2 | 7/2014 | Sheriff et al. |
| 2002/0169716 | A1 | 11/2002 | Johnson et al. |
| 2003/0231589 | A1 | 12/2003 | Itoh et al. |
| 2004/0246920 | A1 | 12/2004 | Savolainen |
| 2005/0226196 | A1 | 10/2005 | Suh |
| 2005/0265283 | A1* | 12/2005 | Qi et al. ............... 370/331 |
| 2006/0019675 | A1* | 1/2006 | Miyajima et al. ........ 455/456.1 |
| 2006/0227744 | A1* | 10/2006 | Metke et al. ............. 370/331 |
| 2007/0037550 | A1 | 2/2007 | Armstrong |
| 2007/0076664 | A1 | 4/2007 | An et al. |
| 2007/0147317 | A1 | 6/2007 | Smith et al. |
| 2008/0009279 | A1 | 1/2008 | Sakawa |
| 2008/0096560 | A1 | 4/2008 | Felske et al. |
| 2008/0107051 | A1 | 5/2008 | Chen et al. |
| 2008/0137537 | A1 | 6/2008 | Al-Manthari et al. |
| 2008/0186917 | A1 | 8/2008 | Wu et al. |
| 2009/0061862 | A1 | 3/2009 | Alberth, Jr. et al. |
| 2009/0061870 | A1 | 3/2009 | Finkelstein et al. |
| 2009/0298467 | A1 | 12/2009 | Zohar |
| 2010/0214943 | A1* | 8/2010 | Immendorf et al. ......... 370/252 |
| 2010/0296487 | A1* | 11/2010 | Karaoguz et al. ........... 370/332 |
| 2010/0304737 | A1 | 12/2010 | Jain et al. |
| 2011/0085518 | A1 | 4/2011 | Taaghol et al. |
| 2011/0096673 | A1 | 4/2011 | Stevenson et al. |
| 2011/0170450 | A1 | 7/2011 | Juntti et al. |
| 2011/0306318 | A1 | 12/2011 | Rodgers et al. |
| 2012/0014271 | A1* | 1/2012 | Damenti ................. 370/252 |
| 2012/0052914 | A1 | 3/2012 | Yaqub et al. |
| 2012/0094653 | A1 | 4/2012 | Okuda |
| 2012/0195223 | A1 | 8/2012 | Raleigh |
| 2012/0282915 | A1 | 11/2012 | Haynes et al. |
| 2012/0307645 | A1 | 12/2012 | Grosman et al. |
| 2012/0309413 | A1 | 12/2012 | Grosman et al. |
| 2013/0035115 | A1 | 2/2013 | Lindegren et al. |
| 2013/0040693 | A1 | 2/2013 | Chen |
| 2013/0045744 | A1* | 2/2013 | Dimpflmaier et al. ....... 455/437 |
| 2013/0051233 | A1* | 2/2013 | Yang et al. ................. 370/235 |
| 2013/0148567 | A1 | 6/2013 | Efrati et al. |
| 2013/0155842 | A1 | 6/2013 | Moore |
| 2013/0203438 | A1 | 8/2013 | Shin |
| 2013/0225181 | A1* | 8/2013 | Radulescu et al. .......... 455/442 |
| 2014/0003342 | A1 | 1/2014 | Sherriff et al. |

FOREIGN PATENT DOCUMENTS

| | | |
|---|---|---|
| EP | 2244501 A1 | 10/2010 |
| EP | 2244502 A1 | 10/2010 |
| WO | 00/38446 | 6/2000 |
| WO | 2002-041580 A1 | 5/2002 |
| WO | 2004-047476 A1 | 6/2004 |
| WO | 2006-005947 A1 | 1/2006 |
| WO | 2008/060464 A2 | 5/2008 |
| WO | 2011-162688 A1 | 12/2011 |

OTHER PUBLICATIONS

Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.
VoLGA Forum, "VoLGA Stage 2 V1.7.0: Voice over LTE via Generic Access," Jun. 14, 2010.
Qualcomm Europe et al., "Text Proposal for UE Measurements for Minimizing Drive Tests," 3GPP TSG-RAN WG2 Meeting #66, R2-093175, May 4-8, 2009.
Qualcomm Europe, "Framework for UE SON Reports," 3GPP TSG RAN WG3 & SA WG5, S5-090017, Jan. 12-13, 2008.
U.S. Patent and Trademark Office; Non-Final Rejection; U.S. Appl. No. 13/830,949; dated Jun. 17, 2013.
U.S. Patent and Trademark Office; Non-Final Rejection; U.S. Appl. No. 13/830,949; dated Sep. 6, 2013.
Apple Insider,' [online]. "Apple's 'Wi-Fi Cellular' option is iOS 6 to keep apps syncing when WiFi networks choke," 2012, [retrieved on Aug. 20, 2012]. Retrieved from the Internet: URL:http://www.appleinsidercom/articles/12/08/09/apples—wi—fi—plus—celluar—option—in—ios-6—to—keep—apps—syncing—when—wifi—networks 2 pages.
Aguayo et al., "Link-Level Measurements from an 802.11b Mesh Network," in Proceedings of SIGCOMM, Aug. 2004, 11 pages.
Ahn et al., "Supporting Service Differentiation for Real-Time and Best-Effort Traffic in Stateless Wireless Ad Hoc Networks (SWAN)," IEEE Transactions on Mobile Computing, Jul. 2002, 1(3):192-207.
Bicket,, "Bit-rate Selection in Wireless Networks," Master's thesis, Massachusetts Institute of Technology, 2005, 50 pages.
Chakeres, and Belding-Royer. "PAC: Perceptive Admission Control for Mobile Wireless Networks," in Proceedings of QShine, Oct. 2004, 18-26.
Chen and Heinzelman, "QoS-aware routing based on bandwidth estimation for mobile ad hoc networks," IEEE JSAC, Mar. 2005, 23(3):561-572.
Chen et al., "QoS Routing Performance in Multihop, Multimedia, Wireless Networks," In Proceedings of IEEE International Conference on Universal Personal Communications, Jun. 1997, 5 pages.
De Couto et al., "A High-Throughput Path Metric for Multi-hop Wireless Routing," In Proceedings of MobiCom, Oct. 2003, 11:419-434.
Draves et al., "Comparison of Routing Metrics for Static Multi-Hop Wireless Networks," in ACM International Conference on Special Interest Group on Data Communication, Mar. 2004, 12 pages.
Draves et al., "Routing in Multi-radio, Multi-hop Wireless Mesh Networks," In Proceedings of MobiCom, Sep. 2004, 15 pages.
Gupta and Kumar, "The capacity of wireless networks," IEEE Transactions on Information Theory IT, Mar. 2000, 46(2):388-404.
Henderson et al., "The Changing Usage of a Mature Campus-wide Wireless Network," In Proceedings of MobiCom, Sep. 2004, 21 pages.
Jardosh et al., "IQU: Practical Queue-Based User Association Management for WLANs," in Proceedings of MobiCom, Sep. 2006, 12 pages.
Lee et al., "Insignia: An IP-Based Quality of Service Framework for Mobile ad Hoc Networks," Journal of Parallel and Distributed Computing, Ap. 2000, 60(4):68-76.
Lin and Liu, "QoS routing in ad hoc wireless networks," IEEE JSAC, Aug. 1999, 17(8):1426-1438.
Padhye et al., "Estimation of Link Interference in Static Multi-hop Wireless Networks," In Proceedings of Internet Measurement Conference, Oct. 2005, 6 pages.
Reis et al., "Measurement-Based Models of Delivery and Interference in Static Wireless Networks," In Proceedings of SIGCOMM, Sep. 2006, 12 pages.
Sheriff et al., "Measurement Driven Admission Control on Wireless Backhaul Networks," Computer Communications, May 2008, 31(7):1354-1371.
Wong et al., "Robust Rate Adaptation for 802.11 Wireless Networks," In Proceedings of MobiCom, Sep. 2006, 12 pages.

(56) References Cited

OTHER PUBLICATIONS

Wu et al., "SoftMAC: Layer 2.5 MAC for VoIP Support in Multi-hop Wireless Networks," In Proceedings of SECON, Sep. 2005, 11 pages.
Xia et al., "An Intelligent Vertical Handoff Algorithm in Heterogeneous Wireless Networks," 2008 International Conference on Neural Networks and Signal Processing, Jun. 7-11, 2008, 550-555.
Xu et al., "How effective is the IEEE 802.11 RTS/CTS handshake in ad hoc networks," In Proceedings IEEE GLOBECOM'02, Nov. 2002, 7 pages.
Xue and Ganz, "Ad hoc QoS on-demand routing (AQOR) in mobile ad hoc networks," Journal of Parallel and Distributed Computing, 2003, 63(2):154-165.
Zahran et al., "Signal Threshold Adaptation for Vertical Handoff in Heterogeneous Wireless Networks," IFIP Networking, May 2-6, 2005, 1-32.
Zhu and Corson, "QoS routing for mobile ad hoc networks," In Proceedings of ICC, Jun. 2002, 12 pages.
International Search Report and Written Opinion in International Application No. PCT/US2013/047946, dated Dec. 17, 2013, 18 pages.
Lin, "Admission Control in Time-Slotted Multihop Mobile Networks," IEEE JSAC, 19(10): 1974-1983, Oct. 2001.
Yang and Kravets, "Contention-Aware Admission Control for Ad Hoc Networks," IEEE Transactions on Mobile computing 4(4): 363-377, Jul./Aug. 2005.
Computer and Communications Societies. Proceedings IEEE, vol. 4, pp. 2525-2535, Mar. 2005.

\* cited by examiner

COMPUTING DEVICE WITH WIRELESS NETWORK SELECTION FEATURE

CROSS-REFERENCE TO RELATED APPLICATIONS

This application claims the benefit of priority under 35 U.S.C. § 119(e) to U.S. Provisional Application Ser. No. 61/791,096, which was filed on Mar. 15, 2013, and U.S. Provisional Application Ser. No. 61/708,842, which was filed on Oct. 2, 2012, and to U.S. Provisional Application Ser. No. 61/690,567, which was filed on Jun. 27, 2012. The entire contents of which are incorporated herein by reference.

TECHNICAL FIELD

This specification generally describes computer-based selection of a communications network or access point based on budget information.

BACKGROUND

Mobile computing devices, such as smartphones and tablet computing devices, have included various wireless communications interfaces for communicating over various types of wireless networks (e.g., 3G, 4G LTE, 4G WiMAX, WiFi, BLUETOOTH). Mobile computing devices have been configured to automatically switch from using fee-based wireless data networks, such as 3G and/or 4G wireless data networks for which a fee (e.g., monthly subscription) is charged for access, to using free wireless data networks, such as WiFi networks, when an access point for such a free wireless network is within range of a mobile computing device.

SUMMARY

This document describes techniques, methods, systems, and computer program products for determining whether and when to switch a mobile computing device (e.g., a laptop computer, a tablet computer, a smartphone, etc.) from using a wireless access point to using another wireless access point. In particular, a current use of a fee-based data service can be compared to a periodic budget (e.g., daily budget, weekly budget, monthly budget) for the fee-based data service to determine whether to switch from/to an access point associated with the fee-based data service to/from an access point for a different data service, such as a non-fee data service (e.g., free WiFi access point) or a different fee-based data service to which a different budget may apply.

Determinations of whether to use a wireless access point can additionally be based on the quality of a possible wireless connection with a wireless access point that is within range of a mobile computing device. For example, whether or not a mobile computing device switches to a different wireless access point can be based on whether the device/user is currently ahead or behind a periodic budget for a fee-based data service and based on an estimated quality of connection with the different wireless access point. For instance, if an available wireless access point to which a mobile computing device could switch has an estimated low quality connection (e.g., estimated high rate of packet loss), the mobile computing device may switch to using the wireless access point when the device/user is behind a period budget for a fee-based data service (e.g., deficit based on estimated rate/schedule for using the budget) that the mobile computing device is currently using (switching from). In contrast, the mobile computing device may not switch to using the wireless access point when the device/user is ahead of the periodic budget for the fee-based data service (e.g., surplus based on estimated rate/schedule for using the budget).

A variety of metrics can be used to determine the quality of a wireless connection, such as packet loss rates. Although mobile computing devices generally determine packet loss rates by monitoring the rate at which packet transmissions with an access point are lost, passive techniques can be used that allow for mobile computing devices to determine packet loss rates without establishing a connection with or transmitting data packets through an access point. For instance, a mobile computing device can estimate a packet loss rate for a wireless connection that could be established with a wireless access point that is within range of the mobile computing device's current location based on a variety of passively obtained information, such as a received signal strength indicator (RSSI) for the wireless access point, geographic location information (e.g., GPS data) for the mobile computing device, and/or temporal information (e.g., current time of day, day of week). Profiles for wireless access points can be generated and used to correlate passively obtained information with quality metrics for wireless connections with wireless access points, such as packet loss rates.

As part of a mobile computing device's determination of whether to switch between wireless access points, the device may analyze profiles associated with each of the access points with which it has previously communicated. Such profiles may generally be maintained by the mobile device, and may include a mapping between communications data packet loss and other factors, such as signal strength, location, and time. Using passively obtained parameters (e.g., a signal strength value, location coordinates, a current date/time value, etc.), the mobile device may access the profiles to determine a likely percentage of data loss for each of the access points in range, without actively probing the access points, thus conserving device power. Moreover, the mobile device can use adaptive backoff techniques to reduce "flapping" (frequent switching between networks and/or access points).

In certain instances, packet loss rates may be determined using devices other than those of the particular user whose device is now trying to make a determination about access point connections. For example, various users of a service may agree to have signal strength information for particular access points paired with geographic location information about the location of mobile devices that are near such access points. Such data for a large number of different access points can be received by the service, and a profile may be built by the system over time by aggregating the data from the different users. For example, determinations may be made about the signal strength for an access point at a variety of locations around the access point (e.g., for an access point in an airport through which many different people may communicate). Such information may be processed by the service to characterize the relative signal strength of the various access points at various locations. Such characterizations may then be used to create a form of "map" for signal strength, and may in turn be used, as identified below, to determine when the first user's device should switch, of hand off, from one access point to another access point.

In one implementation, a computer-implemented method includes transmitting data over a first wireless connection by a computing device and with a first wireless access point; detecting, by the computing device, a wireless signal from a second wireless access point; accessing, for an account that is associated with a data service provided by the first wireless access point, information that identifies a portion of a budget for the account that has already been spent, wherein the budget identifies an amount of data that is available for transmission over a period of time in association with the account; determining whether the account currently has a budget deficit based on a comparison of i) the portion of the budget that has been spent and ii) a usage pattern that identifies one or more expected rates of consumption of the budget over the period of time; determining, based on whether the account currently has a budget deficit, whether to switch from the first wireless connection with the first wireless access point to a second wireless connection with the second wireless access point; and establishing the second wireless connection as a result of the determining.

Such a computer-implemented method can optionally include one or more of the following features. The computer-implemented method can further include identifying, at the mobile computing device, connection information that describes one or more parameters associated with a potential wireless connection with the second wireless access point; determining, by the computing device and without the computing device transmitting data packets to the second wireless access point after detecting the wireless signal, a quality indicator for the second wireless access point based on the connection information, wherein the quality indicator indicates an estimated level of quality associated with the potential wireless connection with the second wireless access point; and the determination of whether to switch from the first wireless connection to the second wireless connection can further be based on the quality indicator. The connection information can include a received signal strength of the wireless signal from the second wireless access point. The computer-implemented method can further include accessing, for the second wireless access point, a profile that correlates received wireless signal strengths for the second wireless access point with quality indicators for the second wireless access point; and the quality indicators for the second wireless access point can be determined based on the profile for the wireless access point.

The computer-implemented method can further include collecting, by the computing device over a period of time before the computing device transmits data over the first wireless connection with the first wireless access point, statistics for the second wireless access point, wherein the statistics identify quality indicators and received signal strengths for the second wireless access point at intervals during the period of time; and generating at least a portion of the profile for the second wireless access point using the collected statistics. The computer-implemented method can further include identifying a current geographic location of the computing device; and the connection information can include the current geographic location. The computer-implemented method can further include identifying current time information when the computing device detects the wireless signal from the second wireless access point, wherein the time information includes one or more of: a current time, a current week, a current day of the week, a current month, a current day of the month, and a current day of the year; and wherein the connection information can include the current time information. The quality indicator can include an estimated level of data packet loss for the second wireless access point that is determined based on the connection information.

The computer-implemented method can further include determining whether the estimated level of data packet loss for the second wireless access point is greater than or equal to a threshold level of data packet loss; and the estimated level of data packet loss being greater than or equal to a threshold level of data packet loss can indicate that the second wireless connection with the second wireless access point has at least a threshold likelihood of being a low quality connection. When i) the estimated data packet loss is determined to be greater than or equal to the threshold level of data packet loss and ii) the account is determined to currently have a budget deficit, the computing device can determine that the computing device should switch from using the first wireless connection to using the second wireless connection; and the computing device can establish the second wireless connection in response to the determination to switch from using the first wireless connection to using the second wireless connection.

The first wireless access point and the second wireless access point can be part of different wireless networks. The first wireless access point can be part of a mobile data network and the second wireless access point is part of a WiFi network. The mobile data network can include one or more of: a 3G wireless network, a 4G long term evolution (LTE) wireless network, and a 4G WiMAX wireless network. The first wireless access point can be part of a fee-based wireless network that charges users for access to the fee-based wireless network and the second wireless access point can be part of a free wireless network that does not charge users for access to the free wireless network.

In another implementation, a computer-implemented method includes transmitting data over a first wireless connection by a computing device and with a first wireless access point; detecting, by the computing device, a wireless signal from a second wireless access point; accessing, for account that is associated with a data service provided by the first wireless access point, information that identifies a portion of a budget for the account that has already been spent, wherein the budget identifies an amount of data that is available for transmission over a period of time in association with the account; determining, based on the portion of the budget that has been spent, whether at least another portion of the budget for the account is currently available for use by the computing device; determining, based on whether the at least another portion of the budget is currently available for use, whether to switch from the first wireless connection with the first wireless access point to a second wireless connection with the second wireless access point; and establishing the second wireless connection as a result of the determining.

Such a computer-implemented method can optionally include one or more of the following features. When none of the budget is determined to currently be available for use by the computing device, the computing device can determine that the computing device should switch from using the first wireless connection to using the second wireless connection; and the computing device can establish the second wireless connection in response to the determination to switch from using the first wireless connection to using the second wireless connection. The first wireless access point can be part of a fee-based wireless network that charges users for access to the fee-based wireless network and the second wireless access point can be part of a free wireless network that does not charge users for access to the free wireless network.

In another implementation, a computing device includes a wireless network interface that is programmed to transmit data over a first wireless connection with first wireless access point, to detect a wireless signal from a second wireless access point; a budget repository that is programmed to store, for an account that is associated with a data service provided by the first wireless access point, information that identifies a portion of a budget for the account that has already been spent, wherein the budget identifies an amount of data that is available for transmission over a period of time in association with the account; a budget management unit that is programmed to determine whether the account currently has a budget deficit based on a comparison of i) the portion of the budget that has been spent and ii) a usage pattern that identifies one or more expected rates of consumption of the budget over the period of time; a determination unit that is programmed to determine, based on whether the account currently has a budget deficit, whether to switch from transmitting data over the first wireless connection with the first wireless access point to a second wireless connection with the second wireless access point; and a wireless connection manager that is programmed to establish the second wireless connection based on the determination by the determination unit.

Such a computing device can optionally include one or more of the following features. The wireless network interface can further be programmed to identify a received signal strength, at the computing device, of the wireless signal from the second wireless access point; the computing device can further include a packet loss estimation unit that is programmed to determine an estimated level of data packet loss for the second wireless access point based on the signal strength for the second wireless access point, wherein the estimated level of data packet loss is determined without the computing device having transmitted any data packets to the second wireless access point since the wireless signal from the second wireless access point was detected; and the determination unit can further determine whether to switch from transmitting data over the first wireless connection to the second wireless connection further based on the estimated level of data packet loss for the second wireless access point. The first wireless access point can be part of a fee-based wireless network that charges users for access to the fee-based wireless network and the second wireless access point can be part of a free wireless network that does not charge users for access to the free wireless network.

Certain implementations may provide one or more of the following advantages. By considering the current depletion of a periodic budget for a fee-based data service, mobile computing devices can appropriately and automatically switch between wireless access points to provide continuous network connectivity while helping to ensure that use of the fee-based data service does not exceed a budgeted level. The potential quality of a wireless access point connection can be inferred using passive measurements which can be taken without actively transmitting packets using the wireless access point. This can allow for a mobile computing device to only switch to another available wireless access point when at least a threshold quality of connection is likely, which can reduce connection degradation associated with switching between wireless networks and/or wireless access points, and can also improve a user's experience using the mobile computing device. Handoffs between various networks and access points may occur more smoothly and without frequent switching back and forth, conserving system resources and improving user experience. Additionally, by using passive measurements as opposed to probing a wireless access point's quality of connection through active packet transmissions, a mobile computing device may also conserve power consumption and extend battery life of the mobile computing device. The accuracy with which wireless connections can be estimated can be increased by using and adapting individual profiles for wireless access points so as to account for variability in hardware, usage patterns, and surrounding physical environments. By switching between wireless access points as described in this document, a mobile computing device may, for example, increase data transfer rates, reduce device power consumption, reduce user data transmission costs, or otherwise improve the device user's experience.

The details of one or more implementations of the subject matter described in this specification are set forth in the accompanying drawings and the description below. Other potential features, aspects, and advantages of the subject matter will become apparent from the description, the drawings, and/or the claims.

BRIEF DESCRIPTION OF DRAWINGS

Like reference symbols in the various drawings indicate like elements.

DETAILED DESCRIPTION

Figure 1:
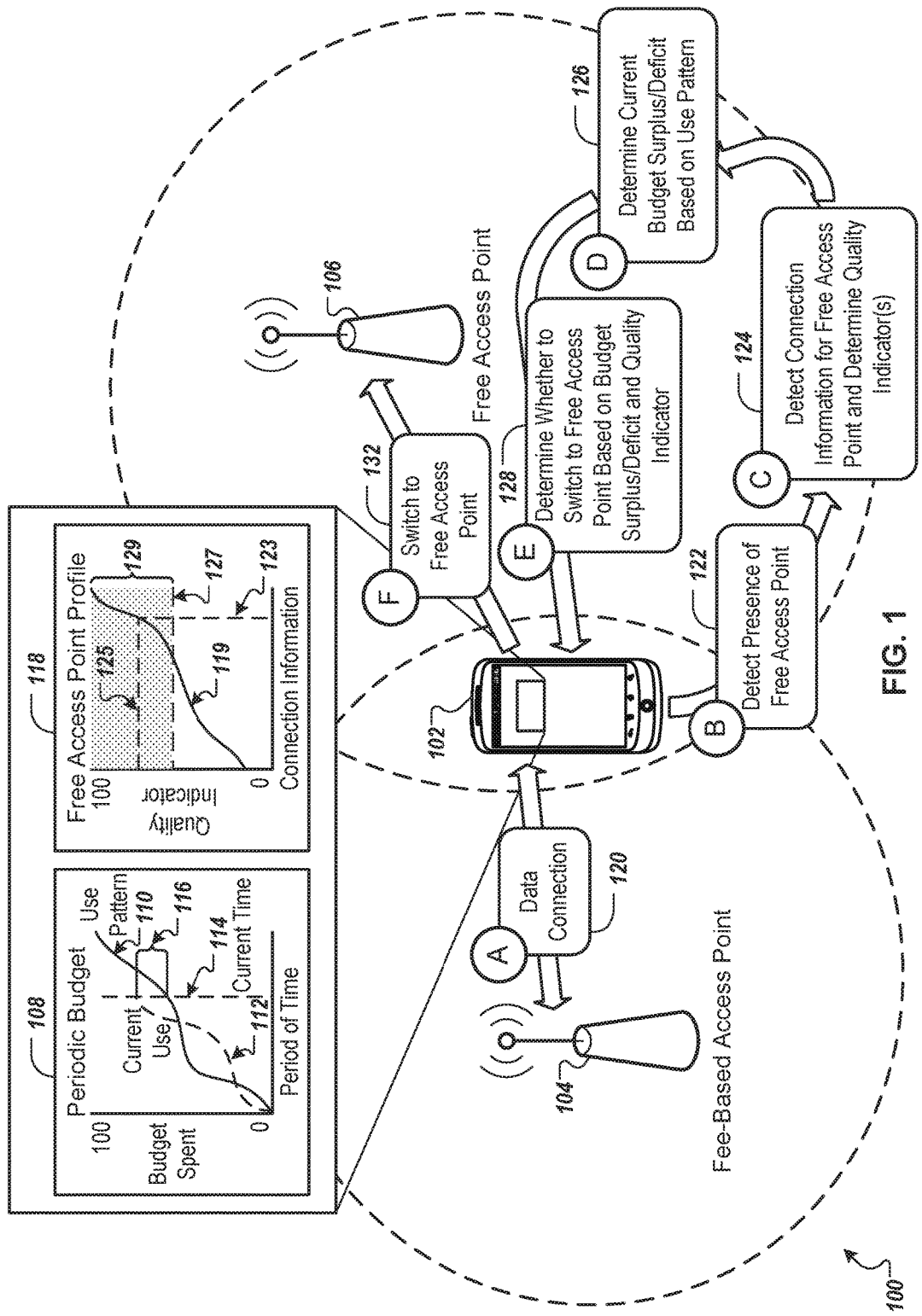
FIG. 1 depicts a conceptual diagram of an example system for determining whether and when to switch a mobile computing device between wireless access points.

This document generally describes techniques, methods, systems, and computer program products for determining whether and when to switch a mobile computing device (e.g., tablet computing devices, smartphones, netbooks, portable media players, personal digital assistants (PDAs), laptops) from using one wireless access point to using another wireless access point. Generally, mobile computing devices can determine whether to switch between wireless access points based on a current available budget for fee-based data service and/or a quality of a wireless connection with a wireless access point based on information that is passively obtained by mobile computing devices, such as received signal strength indicators detected by mobile computing devices for wireless access points, geographic location information for mobile computing devices relative to geographic locations of wireless access points, and/or current temporal information at times when mobile computing devices are determining whether to establish wireless connections with wireless access points.

Mobile computing devices have been configured to automatically switch from connections with wireless access points that provide access to fee based wireless networks, such as 3G and 4G wireless networks, to connections with other wireless access points that may provide access to non-fee based wireless networks, such as WiFi networks, when such other wireless access points (non-fee based wireless networks) are within range of the mobile computing devices. However, such automatic switching can be done without consideration of the quality of the wireless connection to which a mobile computing device is switching. For instance, a mobile computing device may first be within range of a wireless access point for a WiFi network at the edge of the wireless access point's range. Automatically switching to the WiFi network while the mobile computing device is at the edge of the range of the wireless access point can result in a poor network connection for the mobile computing device with high levels of packet loss. This situation can result in poor performance for a user of the mobile computing device, which may have switched to the WiFi network from a connection with another wireless access point that was providing a reliable network connection to the mobile computing device, such as a 3G or 4G wireless network.

A decision of whether and when to switch from one type of wireless network to another (or whether and when to switch between a particular wireless network's various access points) may be based at least in part on a current use of a budget for a fee-based data service (e.g., portion of a capped data plan that has been consumed during a period of time) and/or measured characteristics of a network and the network's access points, such as the rate of data packet/frame loss. The current use of a budget for a fee-based data service can be based on a variety of factors, such as whether a periodic budget (e.g., monthly data transmission allowance, such as 4 GB/month) for a fee-based data service has been exhausted, whether consumption of the budgeted amount is ahead or behind an average rate of consumption for the period of time for the budget, and/or whether consumption of the budgeted amount is ahead or behind a usage pattern for the period of time for the budget.

Measuring characteristics for a wireless access point may involve a mobile computing device actively communicating with the wireless access point so as to sample the quality of a wireless connection using the wireless access point (e.g., unsuccessfully transmitted data packets as a percentage of total packets). However, such measured characteristics for a detected wireless access point that is within range of a mobile computing device may not be readily available to the mobile computing device for a newly discovered wireless access point (no packets have yet been transmitted to the newly discovered wireless access point by the mobile computing device). Such a newly discovered wireless access point may be detectable and its signal strength may be measureable by the mobile computing device, but to directly determine potential data loss for the newly discovered wireless access point, the mobile device may need to probe the wireless access point, which can consume power (e.g., battery charge) and use available processing resources on the mobile computing device. This strain on the mobile computing device's resources may increase as the mobile computing device is moved around (e.g., probe a wireless connection with a wireless access from different locations of the mobile computing device relative to the location of the wireless access point) and/or as the mobile computing device discovers additional wireless access points.

To identify potential data loss (e.g., packet loss) for a wireless access point without probing, the data loss can be estimated based on information that is passively obtained by a mobile computing device, such as a received signal strength indicator (RSSI) for the access point as detected by the mobile computing device. Signal strength, for example, may be passively tracked by a mobile device's communications driver without consuming additional power during normal device operation. However, the relationship between signal strength and packet loss may vary from access point to access point, depending on factors such as interference, usage patterns, and/the physical environment around a wireless access point. Thus, the mobile device may build a profile for each access point that it connects to, measuring and storing signal strength and packet loss information as it communicates data using the access point. When the mobile device detects an access point for which it has previously built a profile, for example, the device may use signal strength information to estimate a corresponding packet loss for the access point. Moreover, additional information (e.g., location information, time information, etc.) may be measured and stored by the mobile device as it communicates with an access point for generating and refining an access point profile.

For example, a mobile device may switch from a metered network with broad coverage (e.g., a mobile communications network such as a 3G or 4G network) to an access point associated with an unmetered network with a limited range (e.g., a WiFi access point) based on a current use of a periodic budget for the metered network and whether the estimated data loss (e.g., packet loss) of the access point is under a suitable threshold. Packet loss may change drastically within a few dBs, particularly when the mobile device is close to the edge of an access point's range. This may lead to "flapping" (frequent switching back and forth between the mobile communications and WiFi networks). Thus, an adaptive threshold may be used for switching to a WiFi network. When frequent "flapping" is detected, for example, such a threshold may lowered so that a lower estimated rate of data loss (a better estimated quality of the wireless connection) for a wireless access point is used by the mobile computing device to determine whether to subsequently switch to using the wireless access point.

Various other details and implementations are described in greater detail below with regard to the figures.

FIG. 1 depicts a conceptual diagram of an example system 100 for determining whether and when to switch a mobile computing device between wireless access points. The example system 100 includes a mobile computing device 102, which can be employed by a user to send and receive data over various types of wireless networks, such as a communications provider's 3G and/or 4G networks, a local WiFi network, and/or a BLUETOOTH network. For example, the mobile computing device 102 may include a web browser for accessing Internet web pages, and/or may include one or more mobile device applications ("apps") for accessing cloud-based data services. The mobile computing device 102, for example, may be any of a variety of appropriate computing devices, such as laptop computers, tablet computing devices, smartphones, PDAs, portable media players, and/or e-book readers.

To communicate data over a network, the mobile computing device 102 may connect with one of the network's access points, such as a 3G or 4G network's cell tower, and/or a WiFi network's wireless router. The mobile computing device 102 may include hardware and/or software interfaces for detecting access points that may be in range, for receiving information about the access points (e.g., access point identifiers, signal strength information, network traffic statistics, etc.), and for handling data communication via the access points. In the depicted example system 100, the mobile computing device 102 is presently in range of (and may communicate with) a fee-based access point 104 ("Fee-Based Access Point") and a free (no fee) access point 106 ("Free Access Point"). For example, the fee-based access point 104 may be associated with a mobile data network (e.g., 3G mobile data network, 4G mobile data network) that charges a fee (e.g., monthly subscription fee, usage fee) for access to the mobile data network. The free access point 106 can provide access to a data network that is freely accessible without a fee. For instance, the free access point 106 can be a WiFi access point. In some implementations, the free access point 106 can be associated with another fee-based data network with a periodic budget that is different from the periodic budget of the fee-based access point 104.

The mobile computing device 102 can maintain budget information for the fee-based data service that is provided through the fee-based access point 104, such as the example periodic budget 108 that is depicted in FIG. 1. The periodic budget 108 can correspond to a budget of units (e.g., quantity of data transmitted, time spent connected to and/or transmitting data using the fee-based access point 104) that are available for consumption by the mobile computing device 102 using the fee-based access point 104 over a period of time (e.g., a day, a week, a month, a quarter). For example, the periodic budget 108 can correspond to a quantity of data (e.g., 4 GB, 8 GB) that are available for the mobile computing device 102 to transmit using a wireless connection with the fee-based access point 104 (and/or other access points that are associated with the same fee-based data service as the fee-based access point 104) over a month (example period of time).

As depicted in the example periodic budget 108, a use pattern 110 can identify a pattern of use of the budget (e.g., quantity of data, time transmitting/connected to fee-based data service) over a period of time by the mobile computing device 102, a user associated with the mobile computing device 102, and/or a group of users and computing devices of which the mobile computing device 102 is a member (e.g., member of a family mobile data plan that is shared across multiple computing devices). The use pattern 110 can be based on previous use of the periodic budget 108 and can provide an estimate of when, during the period of time for the budget 108, the mobile computing device 102 is expected to consume the budgeted units (e.g., quantity of data transmitted, time connected to the fee-based data service). For instance, the use pattern 110 may indicate that the mobile computing device 102 is expected to perform a greater quantity/amount of data transmissions during weekends than during weekdays with regard to the fee-based data service provided by the access point 104.

The use pattern 110 can be generated based on one or more previous periods of use of the fee-based data service provided through the fee-based access point 104. For instance, the mobile computing device 102, with the user's consent, may record information regarding use of the fee-based data service that is associated with the fee-based access point 104, such as quantities of data that are transmitted by the mobile computing device 102 using the service over various periods of time (e.g., quantities transmitted during different hours of the day, days of the week, weeks, months). The use pattern 102 can be generated based on the historical use of the fee-based data plan by the mobile computing device 102 so as to model an expected use of the fee-based data plan during a current period of time. For instance, if the current month is the period of time and patterns are detected in the historical use of the fee-based data plan that indicate greater levels of data transmission during weekends than weekdays and greater levels of data transmission during mornings and evenings as opposed to the middle of the day and overnight, the use pattern 110 can be generated for the current month to reflect the expectation that the user will transmit greater levels of data using the fee-based data plan during weekends, mornings, and evenings. The use pattern 110 can include expected levels of data to be transmitted (and/or time of use) during particular portions (e.g., each hour, every 6 hours, each day) of the period of time (e.g., week, month) such that the fee-based data plan will be fully used by the mobile computing device 102 throughout the period of time without exceeding the available budget (e.g., 4 GB, 8 GB, 50 hours of use, 100 hours of use). As indicated in the example periodic budget 108, the use pattern 110 is generated such that the budget is fully spent by the end of the period of time.

The use pattern 110 can be compared to a current use 112 of the budget to determine whether the mobile computing device 102 is, as of a current time 114), ahead or behind with regard to the expected use pattern 110. In the depicted example, the current use 114 has outpaced the expected use pattern 110 for the period of time, as indicated by the difference 116 between the current use 114 and the use pattern 110 (indicating that the mobile computing device 102 is ahead of the expected use, during the period of time, of the fee-based data service that is associated with the fee-based access point 104). Such a determination of whether the mobile computing device 102 is ahead or behind of an expected use of the fee-based data service that is associated with the fee-based access point 104 can be used, alone or in combination with information indicating an expected quality of connection with the free access point 106, to determine whether to switch from a data connection with the fee-based access point 104 to a data connection with the free access point 106. Other use patterns can also be used to make such a determination, such as a use pattern that provides an average daily spend of the budget for the period of time, a use pattern that provides an average daily spend of a remaining budget for a remaining portion of the period of time, and/or an unrestricted use pattern that allows for the fee-based data service to be used freely until the budget for the period of time has been exhausted at which point use can be capped.

The mobile computing device 102 can maintain profiles for access points that correlate information ("connection information") related to a current potential connection with the access point, such a received signal strength (RSSI) for an access point and/or a current geographic location of the mobile computing device 102, to information ("quality indicator") that indicates an expected quality of connection with the access point, such as an expected rate of packet loss. For instance, an example profile 118 is depicted in FIG. 1 for the free access point 106. The example profile 118 includes a model 119 that correlates connection information (e.g., RSSI, geographic location, time information) to one or more quality indicators (e.g., rate of data packet loss) for the free access point 106. For example, the profile 118 can correlate detected signal strength and rates of packet loss for the free access point 106, which may vary depending on factors such as interference and surrounding physical environments. While communicating with an access point, for example, the mobile computing device 102 can build and maintain a profile (e.g., a graph, a model, etc.) for the access point by periodically sampling the number of data packets lost, the number of data packets successfully transmitted, and one or more factors that may be related to data loss, such as the access point's signal strength (e.g., as determined by a device transceiver), the device's geographic location (e.g., GPS coordinates), the current date/time, and/or overall network traffic levels. For each sampling interval, for example, the mobile computing device 102 can identify one or more quality indicators (e.g., packet loss rate) and connection information (e.g., an average signal strength), and can use this information to update the access point's profile accordingly. Other examples access point profiles are described in greater detail below with regard to FIGS. 3A-C.

In addition to depicting a conceptual diagram of the example system 100 for determining whether and when to switch a mobile computing device between wireless access points, FIG. 1 also illustrates an example flow of data within the system 100 during steps A to F. The steps A to F may occur in the illustrated sequence, or they may occur in a sequence that is different than in the illustrated sequence. For example, the steps A to F may be performed by the mobile computing device 102 in a variety of orders, and/or one or more steps may be performed concurrently.

As indicated by step A (120), the mobile computing device 102 can have a data connection with the fee-based access point 104. The access point 104, for example, may be a cell tower maintained by a provider of a 3G or 4G fee-based data communication network. The mobile computing device 102 may use the network connection to send and receive data via the access point 104 during a user's web browsing session, for example.

As indicated by step B (122), the mobile computing device 102 can detect the presence of the free access point 106. The free access point 106, for example, may be a WiFi access point (maintained by an entity such as a coffee shop, for example), or may be another sort of access point. For example, the user of the mobile computing device 102 may enter the coffee shop during his or her web browsing session while using the data connection with the access point 104, and the device 102 may recognize free access point 106 as being "in range" or otherwise available. The mobile computing device 102, for example, may include transceivers and/or sensors for detecting various access points as they become available (or unavailable).

In response to detecting the presence of the access point 106, the mobile computing device 102 can detect connection information (e.g., received signal strength (RSSI) of the access point 106 from the current location of the mobile computing device 102, geographic location of the mobile computing device 102, a current time of day and/or day of week) and, based on the profile 118 and the connection information, can determine one or more quality indicators (e.g., rate of packet loss) for a wireless connection between the mobile computing device 102 and the access point 106, as indicated by step C (124). For example, the received signal strength for the wireless access point 106 can vary depending on the location at which the mobile computing device 102 is measuring the signal strength. For instance, the received signal strength when the mobile computing device 102 is located within a few feet of the access point 106 can be greater than when the mobile computing device 102 is located one hundred feet away from the access point 106. The mobile computing device 102 can determine a quality indicator for a potential wireless connection with access point 106 from the current location of the mobile computing device 102, based on connection information (e.g., signal strength, location, time, etc.) which may be related to the quality of a wireless connection with the access point 105 (e.g., related to packet loss).

As indicated in the graph for the profile 118, detected connection information 123 (e.g., RSSI) is correlated to a quality indicator 125 (e.g., rate of packet loss) using the model 119 for the free access point 106. The quality indicator can be a value along a range of values (e.g., 0 to 100, 0.0 to 1.0) where one end of the range (e.g. 0) indicates a high quality connection (e.g., low rate packet loss) and the other end of the range (e.g., 100) indicates a low quality connection (e.g., high rate of packet loss). In the depicted example, the determined quality indicator 125 for the free access point 106 is above a threshold level 127 (e.g., 20% packet loss rate, 40% packet loss rate, 50% packet loss rate, 75% packet loss rate) that can be used to differentiate between reliable and unreliable data connections. For instance, determined quality indicators that fall within the range 129 above the threshold level 127 can be determined to be unreliable and, when possible and appropriate, the mobile computing device 102 can attempt to avoid switching to use such expectedly unreliable connections.

As indicated by step D (126), the mobile computing device 102 can determine whether the mobile computing device 102 currently has a budget surplus or deficit based on the use pattern 110 and the current use 112 of the fee-based data service that is associated with the access point 104. As discussed above, the mobile computing device 102 can determine that, in the current example, there is currently a budget deficit 116 for the fee-based data service (e.g., current use of the data service has exceeded an estimated and aggregate level of use as of the current time 114).

As indicated by step E (128), the mobile computing device 102 can determine whether to switch to using the access point 106 based on whether there is a budget surplus/deficit and the determined quality indicator for the access point 106. The mobile computing device 102 can make such a determination in a variety of ways. For instance, Table 1 (below) provides a general example of whether the mobile computing device 102 will switch from a data connection with the access point 104 to a data connection with the access point 106 based on whether there is a currently budget surplus or deficit, and whether a connection with the access point 106 from the current location of the mobile computing device 102 is expected to be "good" (e.g., quality indicator below the threshold quality level 127) or "bad" (e.g., quality indicator above or equal to the threshold quality level 127).

TABLE 1

|  | Budget Surplus | Budget Deficit |
| --- | --- | --- |
| Good Quality Connection | Switch | Switch |
| Bad Quality Connection | Avoid | Switch |

As indicated in example depicted in Table 1, if the mobile computing device 102 determines that a data connection with the free access point 106 is expected to be a "good" quality connection (e.g., quality indicator below the threshold level 127), then the mobile computing device 102 can switch from using the fee-based access point 104 to using the free access point 106 regardless of whether there is currently a budget surplus or budget deficit. In contrast, if a data connection with the free access point 106 is expected to be a "bad" quality connection (e.g., quality indicator above or equal to the threshold level 127), then the mobile computing device 102 can determine whether to switch to using the free access point 106 based on whether there is currently a budget surplus or deficit for the periodic budget 108. For instance, when the mobile computing device 102 identifies a "bad" quality connection and determines there to currently be a budget surplus, the mobile computing device 102 can avoid a data connection with the free access point 106 and will not switch to using the free access point 106 (for at least a threshold period of time, as the quality of connection may change if the mobile computing device 102 moves to a different location and/or the current use of the periodic budget may change from a surplus to a deficit). In such a situation, the mobile computing device 102 can continue to use the wireless connection with the fee-based access point 104. In contrast, when the mobile computing device 102 identifies a "bad" quality connection and determines there to currently be a budget deficit (e.g., the budget deficit 116), the mobile computing device 102 can switch to using a wireless data connection with the free access point 106. By switching to using a data connection with the free access point 106 in such a situation, the mobile computing device 102 can ensure that the mobile computing device 102 maintains a data connection while attempting to minimize the budget deficit.

For the example depicted in FIG. 1 and using the decision process outlined in Table 1, the mobile computing device 102 can make a determination to switch to using the free access point 106 even though a data connection with the free access point 106 is expected to be poor (quality indicator 125 is above the threshold level 127) based on the mobile computing device currently having a deficit 116 for the periodic budget 108. As indicated by step F (132), the mobile computing device 102 can switch to using the free access point 106. The mobile computing device 102, for example, may automatically switch access points and/or networks, or may prompt the user for input and/or consent before switching.

Figure 2A:
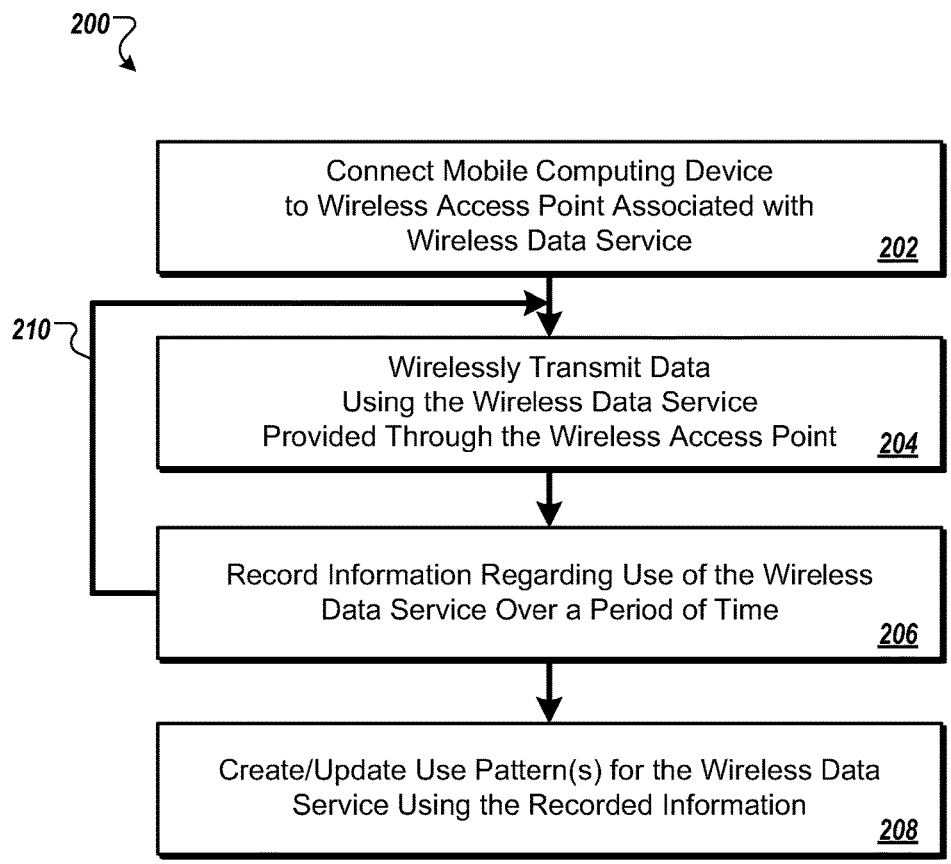
FIGS. 2A-C are flowcharts of example techniques for switching between connections with different wireless access points based on budget information.
Figure 2B:
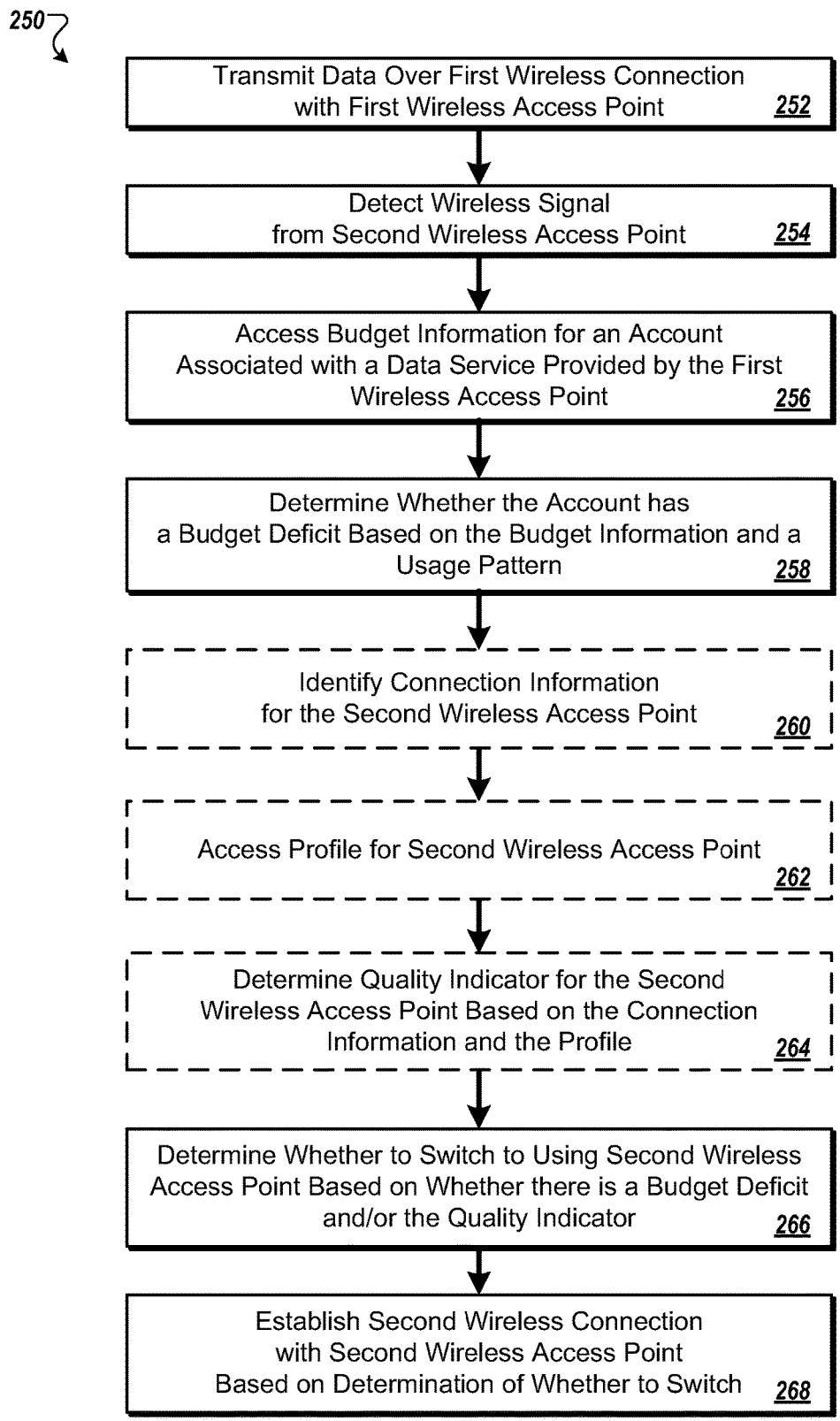
Figure 2C:
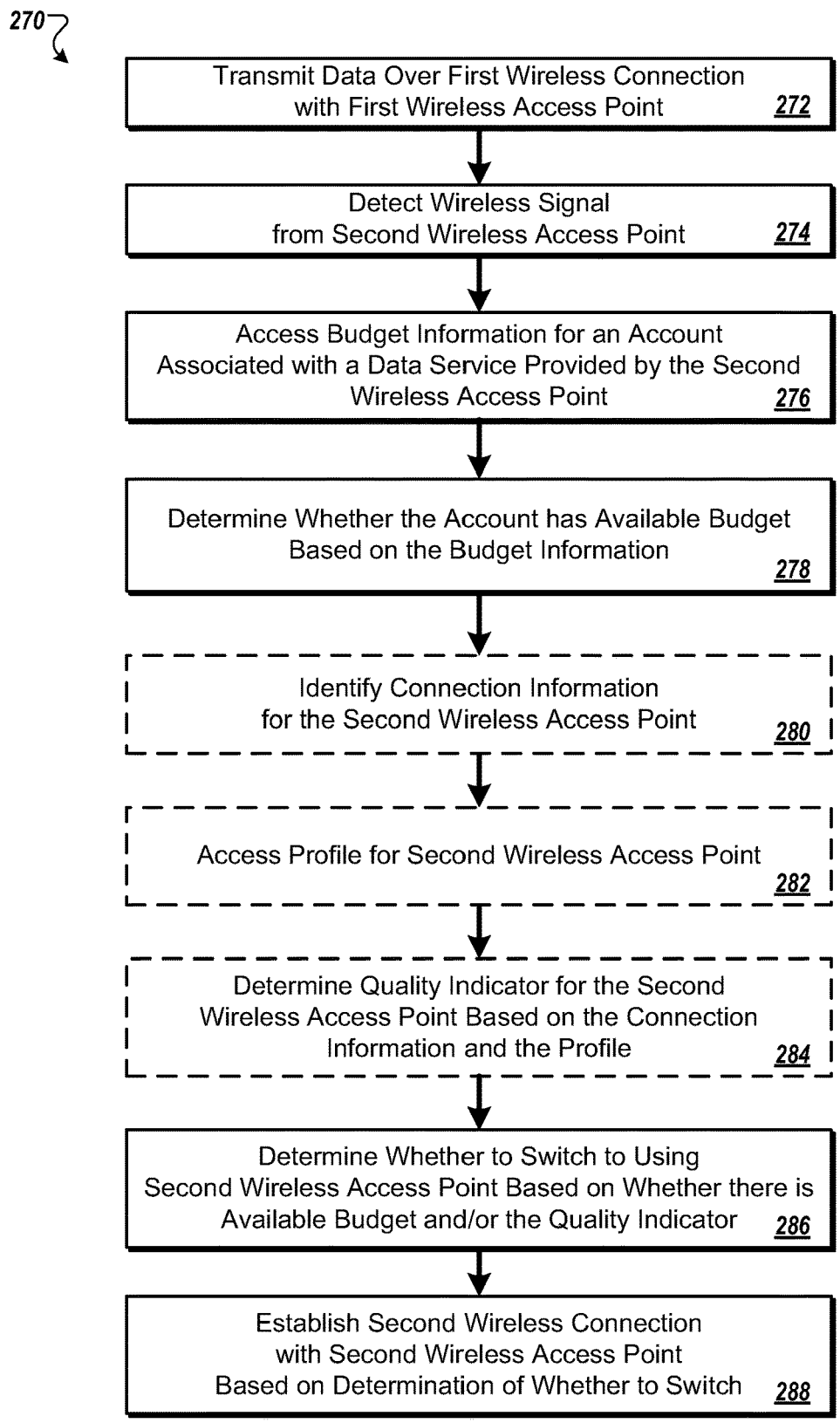

FIGS. 2A-C are flowcharts of example techniques 200, 250, and 270 for switching between connections with different wireless access points based on budget information. The example techniques 200, 250, and 270 can be performed by any of a variety of appropriate computing devices, such as the computing device 102 described above with regard to FIG. 1, computing device 302 described below with regard to FIG. 3A, computing device 342 described below with regard to FIG. 3B, computing device 372 described below with regard to FIG. 3C, computing device 402 described below with regard to FIG. 4, computing device 500 described below with regard to FIG. 5, and/or other computing devices and computer systems.

Referring to FIG. 2A, the example technique 200 can generate usage patterns for fee-based data services, which can be used to make budget-based determinations of whether to switch from using a wireless connection with a wireless access point to using another wireless connection with another wireless access point. Usage patterns can be generated on historical use of a data service that is associated with one or more wireless access points, such as a mobile data service that is provided by a cellular network of wireless access points. Users can have accounts that provide access to fee-based data services, such as accounts that permit various levels of access to 3G and 4G mobile data services. Accounts can have periodic budgets that permit a particular amount of use of the data service over a period of time (e.g., a day, a week, a month), such as a capped quantity of data transmissions during a period of time (e.g., 4 GB/month, 8 GB/month). Users may be able to exceed the use of such periodic budgets, but may be charged additional fees for data use that exceeds the periodic budget. The example technique 200 can be used model a pattern of use of a data service that is associated with one or more wireless access points, which can be used to determine whether to switch between wireless access points.

At 202, a mobile computing device connects to a wireless access point. For example, the mobile computing device 102 can connect to the fee-based access point 104, as indicated by the data connection 120. The mobile computing device 102 can be associated with an account for a fee-based data service that is provided through the fee-based access point 104, and the account can have a periodic budget (e.g., the periodic budget 108) that defines a quantity of use (e.g., quantity of data transmissions, amount of time) of the fee-based data service over a period of time.

The mobile computing device can wirelessly transmit data using the wireless data service that is provided through the wireless access point (204). For example, the computing device 102 can send and receive data using one or more wireless transmission protocols (e.g., IEEE 802.11 wireless radio standard, 3G wireless standard, 4G LTE wireless standard) through the data connection 120.

Information regarding the use of the wireless data service can be recorded over a period of time (206). For example, the mobile computing device 102 can, with the user's consent, record information indicating how much data (e.g., 10 MB, 100 MB) was transmitted by the mobile computing device 102 using the data connection 120 during a communication session. A starting and/or ending timestamp that is associated with such a communication session can be included in the recorded information. In another example, the mobile computing device 102 may track amounts of data that are transmitted using the data connection 120 and at regular intervals (e.g., half hour, hour, six hours, 12 hours, day) record the amount of data transmitted in association with one or more timestamps delineating the time period over which the data was transmitted. As indicated by the arrow 210, the mobile computing device can proceed to wireless transmit data using the wireless data service (204) and record information regarding use of the wireless data service (206).

Use patterns can be created and/or updated for the wireless data service using the recorded information (208). For example, the mobile computing device 102 can combine the recorded use information based on one or more parameters associated with the use, such as a time of day (e.g., morning, evening, 1:00 pm-4:00 pm) during which the use occurred, a day of the week (e.g., weekday, weekend, Monday, Saturday) on which the use occurred, a time of the month (e.g., first week of month) during which the use occurred, a time during the periodic cycle of the periodic budget (e.g., first five days of period, last week of period) during which the use occurred, a month (e.g., September) during with the use occurred, and/or a time of year (e.g., fall, summer, winter) during which the use occurred. The combination of recorded use information over multiple different time periods and according to the one or more parameters can allow for a use pattern to be generated that can model expected use by the user a fee-based data service on the mobile computing device 102 during future periods of time. Recorded information can be combined any of a variety of appropriate ways, such as averaging, weighted averaging (e.g., weighting recorded information based on how recently the information was recorded), and/or selecting a median value from the recorded information.

Referring to FIG. 2B, the example technique 250 can be used to determine whether to switch between wireless connections with different wireless access points based on budget information and, in some implementations, quality indicators for such wireless connections. At 252, a mobile computing device connects to a first wireless access point and transmits data over a first wireless connection with the first wireless access point. Referring to FIG. 1, for example, the computing device 102 can connect to the fee-based access point 104 and transmit data using the data connection 120 with the fee-based access point.

At 254, a wireless signal from a second access point can be detected. For example, the computing device 102 may enter the range of the free access point 106 and/or the access point 106 may otherwise become available. The computing device 102, for example, may detect the availability of the access point 106 via one or more transceivers that are part of the computing device 102.

At 256, budget information for an account that is associated with a data service that is provided by the first wireless access point can be accessed. For example, the fee-based access point 104 may be part of an array of access points that, collectively, provide access to a mobile data network. Such a mobile data network may be restricted (e.g., not available for free) and may require users to have an account (e.g., a mobile data plan) in order to access the mobile data network provided by the fee-based access point. Budget information associated with the account can include information that identifies a quantity of use (e.g., amount of data transmissions, amount of time of use) of the mobile data network over a period of time (e.g., one day, one week, one month) that has been purchased for the account. For instance, the mobile computing device 102 can access the period budget information 108. Accounts and budget information for the accounts can be shared across multiple devices, such as a share mobile data plan that may be shared by the mobile computing device 102 and one or more other mobile computing devices. The budget information can also identify a current amount of the periodic budget that has been spent (used, consumed) by a current time. For example, the budget information can include information that identifies the current use 112 (amount spent) of the periodic budget as of the current time 114.

At 258, a determination can be made as to whether the account currently has a budget deficit based on the budget information and one or more usage patterns. For example, the mobile computing device 102 can determine whether the account has a budget deficit based on a comparison of the usage pattern 110 and the current use 112 of the periodic budget as of the current time 114. The usage pattern 110 can provide an estimation as to one or more rates at which the mobile computing device 102 will spend the periodic budget over the period of time. When the mobile computing device 102 is determined to have a current budget deficit, meaning that the mobile computing device 102 has spent more (in absolute terms or within a threshold value) of the periodic budget 108 as of the current time 114 than expected per the use pattern 110, the mobile computing device 102 may determine that the data connection 120 with the fee-based access point 104, to which the periodic budget 108 applies, should be terminated and instead the mobile computing device 102 should establish a data connection with the free access point 106.

In some implementations, a mobile computing device can additionally determine a quality indicator for the second wireless access point and can use the quality indicator in combination with the determination of whether there is currently a budget deficit to determine whether to switch to using the second wireless access point, as indicated by steps 260-264. For example, connection information for the second wireless access point can be identified (260), a profile for the second wireless access point can be accessed (262), and a quality indicator for the second wireless access point can be determined based on the connection information and the accessed profile (264). For example, the mobile computing device 102 can identify connection information for the free access point 106, such as a received signal strength indicator (RSSI) for the free access point 106 by the mobile computing device 102 at its current location, a geographic location where the mobile computing device 102 is currently located, and/or a current time and/or day. The mobile computing device 102 can access the profile 118 for the free access point 106 and can use the profile 118 to correlate the connection information for the free access point 106 with a quality indicator (e.g., rate of data packet loss) for a potential wireless connection with the free access point 106. The description below regarding FIGS. 3A-C and 6A-B provide further a more detailed explanation of generating and using the profile 118 to determine a quality indicator for the connection.

A determination can be made as to whether to switch to using the second wireless access point based on whether there is a budget deficit for an account associated with the first wireless access point and, in some implementations, a quality indicator for the second wireless access point (266). For example, the mobile computing device 102 can determine whether to switch to using the free access point 106 based on the identified budget deficit 116 for the fee-based access point 104 and, in some implementations, the quality indicator 125 for the free access point 106.

Based on the determination of whether to switch, a second wireless connection with the second wireless access point can be established (268). For example, the mobile computing device 102 can establish a wireless connection with the free access point 106 based on the determination. The mobile computing device 102 can also terminate the wireless data connection 120 with the fee-based access point 104.

Referring to FIG. 2C, the example technique 270 can be used to determine whether to switch between wireless connections with different wireless access points based on budget information. At 272, a mobile computing device connects to a first wireless access point and transmits data over a first wireless connection with the first wireless access point. Referring to FIG. 1, for example, the computing device 102 can connect to the fee-based access point 104 and transmit data using the data connection 120 with the fee-based access point.

At 274, a wireless signal from a second access point can be detected. For example, the computing device 102 may enter the range of the free access point 106 and/or the access point 106 may otherwise become available. The computing device 102, for example, may detect the availability of the access point 106 via one or more transceivers that are part of the computing device 102.

At 276, budget information for an account that is associated with a data service that is provided by the first wireless access point can be accessed. For instance, the mobile computing device 102 can access the period budget information 108.

At 278, a determination can be made as to whether at least a portion of the periodic budget for the account is available (e.g., has not been spent/exhausted) based on the budget information. For example, the mobile computing device 102 can determine whether less than 100% of the periodic budget 108 for the time period has been spent. In the depicted example in FIG. 1, less than 100% of the budget has been spent as of the current time 114, which indicates that at least a portion of the periodic budget has not yet been consumed for the period of time.

In some implementations, a mobile computing device can additionally determine a quality indicator for the second wireless access point and can use the quality indicator in combination with the determination of whether there is currently a budget deficit to determine whether to switch to using the second wireless access point, as indicated by steps 280-284. For example, connection information for the second wireless access point can be identified (280), a profile for the second wireless access point can be accessed (282), and a quality indicator for the second wireless access point can be determined based on the connection information and the accessed profile (284). For example, the mobile computing device 102 can identify connection information for the free access point 106, such as a received signal strength indicator (RSSI) for the free access point 106 by the mobile computing device 102 at its current location, a geographic location where the mobile computing device 102 is currently located, and/or a current time and/or day. The mobile computing device 102 can access the profile 118 for the free access point 106 and can use the profile 118 to correlate the connection information for the free access point 106 with a quality indicator (e.g., rate of data packet loss) for a potential wireless connection with the free access point 106. The description below regarding FIGS. 3A-C and 6A-B provide further a more detailed explanation of generating and using the profile 118 to determine a quality indicator for the connection.

At 286, a determination can be made as whether to switch to using the second wireless access point based on whether at least a portion of the periodic budget is still available for use during the period of time and, in some implementations, a quality indicator for the second wireless access point. Unlike the example technique 250, the technique 270 may not take into consideration usage patterns. For example, the mobile computing device 102 can determine whether to switch to using the free wireless access point 106 based on whether or not the periodic budget 108 for the period of time has been fully spent (no portion of the budget is available for use) and, in some implementations, the quality indicator 125 for the free access point 106. For instance, the mobile computing device 102 can determine that a connection with the free wireless access point 106 should be established (and that the data connection 120 with the fee-based wireless access point 104 should be terminated) when the budget has been fully spent (no remaining budget available for use). In another example, when the budget has not been fully spent (e.g., at least a portion of the periodic budget is available for use) and the quality indicator 125 indicates a good quality of connection (e.g., quality indicator less than the threshold 127), the mobile computing device 102 can switch to using the free access point 106. In a further example, when the budget has not been fully spent and the quality indicator 125 indicates a bad quality of connection (e.g., quality indicator greater than or equal to the threshold 127), the mobile computing device 102 can avoid using the free access point 106, as indicated in Table 2 below.

Based on the determination of whether to switch, a second wireless connection with the second wireless access point can be established (288). For example, the mobile computing device 102 can establish a wireless connection with the free access point 106 based on the determination. The mobile computing device 102 can also terminate the wireless data connection 120 with the fee-based access point 104.

Figure 3A:
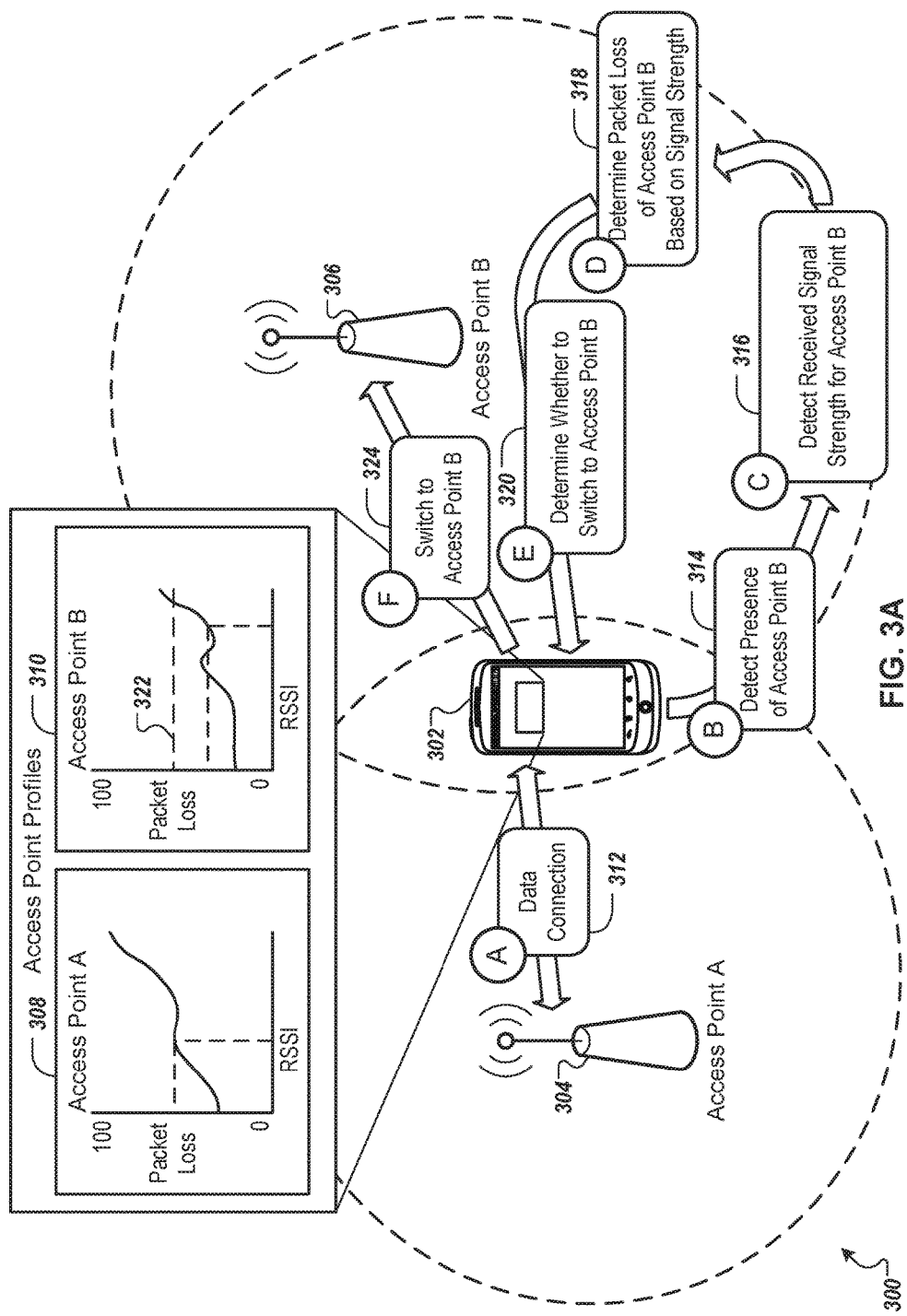
FIGS. 3A-C depict conceptual diagrams of example systems for determining whether and when to switch a mobile computing device between wireless access points.

FIG. 3A depicts a conceptual diagram of an example system 300 for determining whether and when to switch a mobile computing device between wireless access points. The example system 300 includes a mobile computing device 302, which can be employed by a user to send and receive data over various types of wireless networks, such as a communications provider's 3G and/or 4G networks, a local WiFi network, and/or a BLUETOOTH network. For example, the mobile computing device 302 may include a web browser for accessing Internet web pages, and/or may include one or more mobile device applications ("apps") for accessing cloud-based data services. The mobile computing device 302, for example, may be any of a variety of appropriate computing devices, such as laptop computers, tablet computing devices, smartphones, PDAs, portable media players, and/or e-book readers.

To communicate data over a network, the mobile computing device 302 may connect with one of the network's access points, such as a 3G or 4G network's cell tower, and/or a WiFi network's wireless router. The mobile computing device 302 may include hardware and/or software interfaces for detecting access points that may be in range, for receiving information about the access points (e.g., access point identifiers, signal strength information, network traffic statistics, etc.), and for handling data communication via the access points. In the depicted example system 300, the mobile computing device 302 is presently in range of (and may communicate with) an access point 304 ("Access Point A") and an access point 306 ("Access Point B"). Access Points A and B, for example, may each be associated with the same network, or may each be associated with different networks.

The mobile computing device 302 can maintain profiles for each of the access points with which it has previously communicated, such as the access points 304 and 306. Such profiles can correlate detected signal strength and rates of packet loss for each access point, which may vary depending on factors such as interference and surrounding physical environments. While communicating with an access point, for example, the mobile computing device 302 can build and maintain a profile (e.g., a graph, a model, etc.) for the access point by periodically sampling the number of data packets lost, the number of data packets successfully transmitted, and one or more factors that may be related to data loss, such as the access point's signal strength (e.g., as determined by a device transceiver), the device's geographic location (e.g., GPS coordinates), the current date/time, and/or overall network traffic levels. For each sampling interval, for example, the mobile computing device 302 can identify a packet loss rate and an average signal strength (and/or other relevant factors), and can use this information to update the access point's profile accordingly. In the depicted example system 300, the mobile computing device 302 may maintain an access point profile 308 for Access Point A, and a separate, different access point profile 310 for Access Point B, each profile including an example graph of packet loss as a function of signal strength. For implementations which consider additional factors (e.g., location, time, network traffic, etc.), the mobile computing device 302 may maintain a multidimensional model for each access point.

In addition to depicting a conceptual diagram of the example system 300 for determining whether and when to switch a mobile computing device between wireless access points, FIG. 3A also illustrates an example flow of data within the system 300 during steps A to F. The steps A to F may occur in the illustrated sequence, or they may occur in a sequence that is different than in the illustrated sequence. For example, the steps A to F may be performed by the mobile computing device 302 in a variety of orders, and/or one or more steps may be performed concurrently.

As indicated by step A (312), the mobile computing device 302 can have a data connection with the access point 304 (Access Point A). Access Point A, for example, may be a cell tower maintained by a provider of a 3G or 4G data communication network, or may be another sort of access point. The mobile computing device 302 may use the network connection to send and receive data via the access point 304 during a user's web browsing session, for example.

As indicated by step B (314), the mobile computing device 302 can detect the presence of the access point 306 (Access Point B). Access Point B, for example, may be a WiFi access point (maintained by an entity such as a coffee shop, for example), or may be another sort of access point. For example, the user of the mobile computing device 302 may enter the coffee shop during his or her web browsing session while using the data connection with Access Point A, and the device 302 may recognize Access Point B as being "in range" or otherwise available. The mobile computing device 302, for example, may include transceivers and/or sensors for detecting various access points as they become available (or unavailable).

In response to detecting the presence of the access point 306, the mobile computing device 302 can detect the received signal strength (RSSI) of the access point 306 from the current location of the mobile computing device 302, as indicated by step C (316). The received signal strength for the wireless access point 306 can vary depending on the location at which the mobile computing device 302 is measuring the signal strength. For instance, the received signal strength when the mobile computing device 302 is located within a few feet of the access point 306 can be greater than when the mobile computing device 302 is located one hundred feet away from the access point 306. Received signal strength values can vary based on a variety of other factors, such as the type of wireless access point (e.g., WiFi router, 3G/4G network transceiver) and a physical environment surrounding the wireless access point (e.g., surrounding physical structures). Signal strength can be measured in any of a variety of appropriate power levels, such as milliwatts (mW) and/or decibels of measured power referenced to one milliwatt (dBm).

As indicated by step D (318), the mobile computing device 302 can determine an estimated rate of packet loss if it were to communicate with access point 306 (Access Point B) from the current location of the mobile computing device 302, based on the access point's signal strength and/or other factors (e.g., location, time, etc.) which may be related to packet loss. In the present example, since the user of the mobile computing device 302 has previously visited the coffee shop, the device includes a profile for the coffee shop's access point (Access Point B). However, if an access point is unfamiliar and the device does not include an associated access point profile, for example, a default access point profile may initially be generated (e.g., based on an empirical formula based on experiments), or a profile may be retrieved from another source (e.g., a network location, another user, etc.). After generating and/or retrieving a profile, for example, the profile may be refined for the mobile computing device 302 based on measurements taken during a data communication session.

The access point profile 310, for example, may be locally stored (e.g., as a file, in a database, etc.) and may be accessed by the mobile computing device 302 using an identifier associated with Access Point B. In general, different access points may be associated with different rates of packet loss for a given signal strength value. Upon passively receiving signal strength information from Access Point B, for example, the mobile computing device 302 can refer to the access point profile 310 to identify an estimated rate of packet loss for Access Point B based on the signal strength detected by the mobile computing device for the access point 306 at the mobile computing device's current location. Moreover, other factors (e.g., location, time, etc.) which may potentially be related to data loss may be considered by the mobile computing device 302 instead of or in addition to signal strength, as discussed in examples below.

As indicated by step E (320), the mobile computing device 302 can determine whether to switch to using the access point 306 (Access Point B). For example, the mobile computing device 302 can determine whether the rate of packet loss it is likely to experience if it were to switch from using Access Point A to Access Point B is under a threshold level of packet loss 322. The threshold 322, for example, may be a percentage of expected packet loss, such as 10%, 20%, 30%, or another suitable value. In some implementations, a threshold may be used for "switching to" an access point and another, different threshold may be used for "switching away from" the access point. For example, a relatively low threshold (e.g., under 10%, under 20%, etc.) of expected packet loss may be used for "switching to" an access point, whereas a relatively high threshold (e.g., over 40%, over 50%, etc.) of expected packet loss may be used for "switching away from" the access point. Thus, the mobile computing device 302 may switch to an access point when packet loss is expected to be good, and the device may switch away from the access point when packet loss becomes poor.

In some implementations, other characteristics of a current and candidate access point and/or network may be considered when determining whether and when to switch between access points, in addition to expected packet loss. For example, the mobile computing device 302 may consider "Access Point A's" and "Access Point B's" overall data transfer rates, and may consider the device power consumption rates and the financial costs associated with using Access Point A and Access Point B. The mobile computing device 302, for example, may weigh multiple different factors when determine whether and when to switch access points.

Although not depicted in FIG. 3A, the determination in step E (320) of whether to switch to using access point B (306) can additionally be based on budget information for accounts associated with access point A (304) and/or access point B (306), as described above with regard to FIGS. 1 and 2A-C.

As indicated by step F (324), the mobile computing device 302 can switch to using the access point 306 (Access Point B). In the present example, as the expected packet loss for Access Point B is determined to be under the threshold 322, the mobile computing device 302 can switch from using Access Point A (e.g., a 3G or 4G network cell tower) to using Access Point B (e.g., the coffee shop's WiFi access point). The mobile computing device 302, for example, may automatically switch access points and/or networks, or may prompt the user before potentially switching.

Figure 3B:
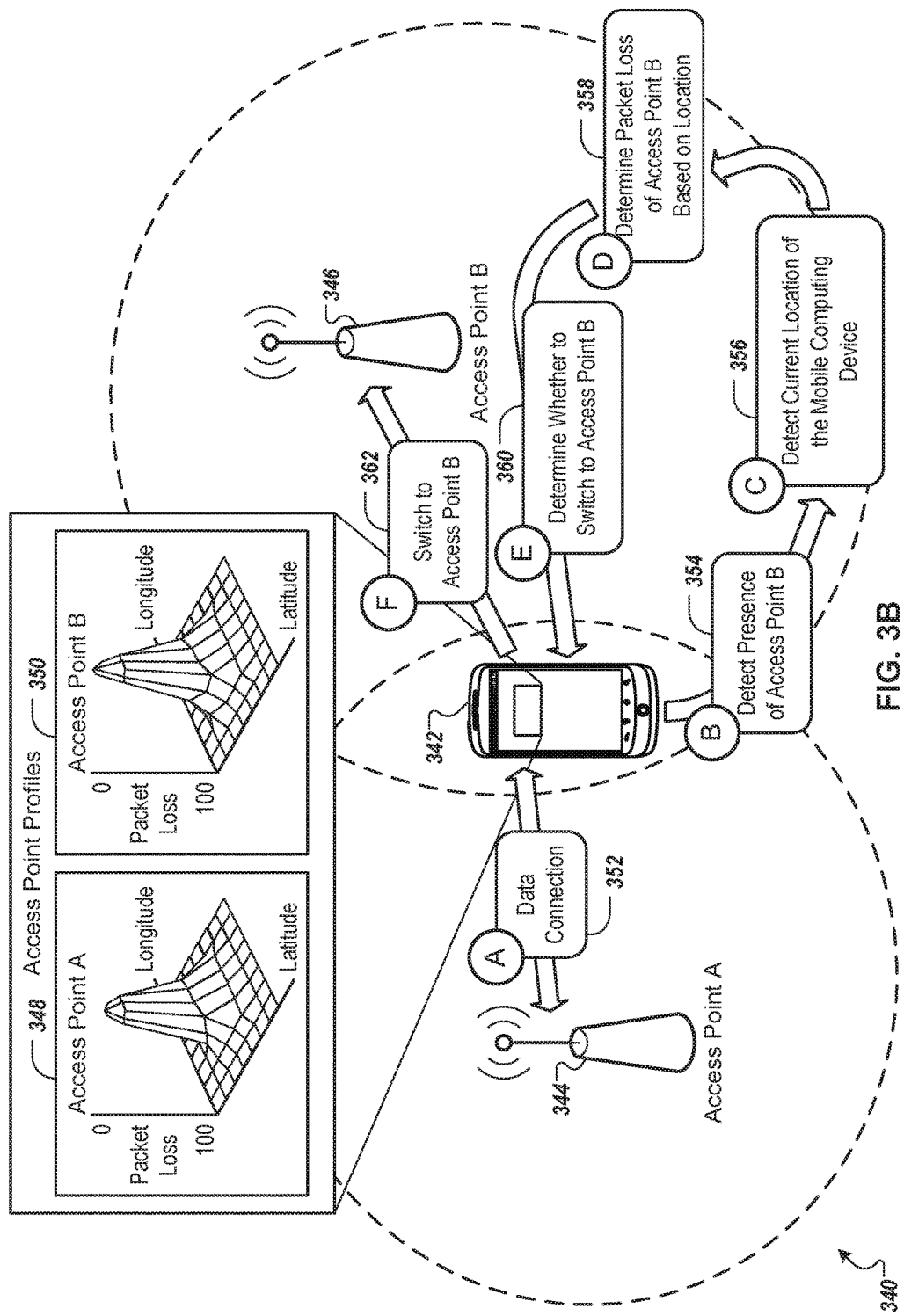

FIG. 3B depicts a conceptual diagram of an example system 340 for determining whether and when to switch a mobile computing device between wireless access points. Similar to the system 300 (shown in FIG. 3A), the example system 340 includes a mobile computing device 342 (similar to the mobile computing device 302), which can be employed by a user to send and receive data over various types of wireless networks. In the depicted example system 340, the mobile computing device 342 may presently be in range of (and may communicate with) an access point 344 ("Access Point A", similar to access point 304) and an access point 346 ("Access Point B", similar to access point 306). Access Points A and B, for example, may each be associated with the same network, or may each be associated with different networks.

The mobile computing device 342 may maintain profiles for each of the access points with which it has previously communicated. In the depicted example in FIG. 3B, the mobile computing device 342 maintains profiles that correlate, at least, device location with rates of packet loss for access points to access point. Such location and packet loss rate correlations may vary from access point to access point, depending on a variety of factors such as interference and the surrounding physical environment. While communicating with an access point, for example, the mobile computing device 342 can build and maintain a profile (e.g., a graph, a model, etc.) for the access point by periodically sampling the number of data packets lost, the number of data packets successfully transmitted, and one or more factors that may be related to data loss, such as the device's location coordinates (e.g., as determined by the Global Positioning System (GPS), triangulation, or another appropriate technique), the access point's signal strength, the current date/time, and/or overall network traffic. For each sampling interval, for example, the mobile computing device 342 can identify a packet loss percentage and an average geographic location (and/or other relevant factors), and can update the access point's profile accordingly. In the depicted example system 340, the mobile computing device 342 may maintain an access point profile 348 for Access Point A, and a separate, different access point profile 350 for Access Point B, each profile including a graph of packet loss as a function of geo location (e.g., latitude and longitude). As depicted in FIG. 3B, the example access point profiles 348 and 350 plot geographic location information, latitude and longitude, to rates of packet loss. For implementations which consider additional factors (e.g., signal strength, time, network traffic, time information), the mobile computing device 342 may maintain a multidimensional model for each access point.

In addition to depicting a conceptual diagram of the example system 340 for determining whether and when to switch a mobile computing device between wireless access points, FIG. 3B also illustrates an example flow of data within the system 340 during steps A to F. The steps A to F may occur in the illustrated sequence, or they may occur in a sequence that is different than in the illustrated sequence. For example, the steps A to F may be performed by the mobile computing device 342 in a variety of orders, and/or one or more steps may be performed concurrently.

As indicated by step A (352), the mobile computing device 342 can have a data connection with the access point 344 (Access Point A). Access Point A, for example, may be a cell tower maintained by a provider of a 3G or 4G data communication network, or may be another sort of access point. The mobile computing device 342 may use the network connection to send and receive data via the access point 344 during a user's web browsing session, for example.

As indicated by step B (354), the mobile computing device 342 can detect the presence of the access point 346 (Access Point B). Access Point B, for example, may be a WiFi access point (maintained by an entity such as a coffee shop, for example), or may be another sort of access point. For example, the user of the mobile computing device 342 may enter the coffee shop during his or her web browsing session, and the device may recognize Access Point B as being "in range" or otherwise available. The mobile computing device 342, for example, may include transceivers and/or sensors for detecting various access points as they become available (or unavailable).

In response to detecting the presence of the access point 346, the mobile computing device 342 can detect its current location, as indicated by step C (356). For instance, the mobile computing device 342 can obtain information that identifies a current location of the mobile computing device 342, such as obtaining GPS coordinates from a GPS unit of the mobile computing device 342.

As indicated by step D (358), the mobile computing device 342 can determine an estimated rate of packet loss if it were to communicate with access point 346 (Access Point B), based on the device's geographic location (e.g., an absolute geographic location (GPS coordinates), a location relative to the location of the access point 346 or another physical location) and/or other factors which may be related to packet loss, such as signal strength and/or current time information. The access point profile 350, for example, may be locally stored (e.g., as a file, in a database) and may be accessed by the mobile computing device 342 using an identifier associated with Access Point B. In general, different access points may be associated with different rates of packet loss for a particular geographic location of the mobile computing device 342. The mobile computing device 342 can compare the obtained location information to the access point profile 350 for the access point 346 to determine an estimated rate of packet loss for the access point 346 were the mobile computing device 342 to wirelessly connect to the access point 346 from its current location. For example, the user of the mobile computing device 342 may have previously enabled the device's GPS functionality while using Access Point B, and historical packet loss information may be available as a function of location, as indicated by the access point profile 350. Upon receiving location information from its GPS interface, for example, the mobile computing device 342 can refer to the access point profile 350 to identify a rate of packet loss for Access Point B that is correlated with the received GPS coordinates.

Other factors (e.g., detected signal strength, time) may also be used in combination the location information for the mobile computing device 342 to determine an estimated rate of packet loss for the access point 346. For example, the access point profile 350 can additionally correlate location and received signal strength with rates of packet loss, and the mobile computing device 342 can use the detected location of the mobile computing device 342, the RSSI for the access point 346, and the access point profile 350 (with location and received signal strength) to determine an estimated rate of packet loss for the access point 346.

As indicated by step E (360), the mobile computing device 342 can determine whether to switch to the access point 346 (Access Point B). For example, the mobile computing device 342 can determine whether the rate of packet loss it is likely to experience if it were to switch from using Access Point A to Access Point B is under a particular threshold. Although not depicted in FIG. 3B, the determination in step E (360) of whether to switch to using access point B (346) can additionally be based on budget information for accounts associated with access point A (344) and/or access point B (346), as described above with regard to FIGS. 1 and 2A-C.

As indicated by step F (362), in the depicted example the mobile computing device 342 switches to the access point 346 (Access Point B) based on the comparison of the estimated rate of packet loss for the access point 346 and the threshold level of packet loss. In the present example, as the expected packet loss for Access Point B is determined to be under the particular threshold, the mobile computing device 342 can switch from using Access Point A (e.g., a 3G or 4G network cell tower) to using Access Point B (e.g., the coffee shop's WiFi access point). The mobile computing device 342, for example, may automatically switch access points and/or networks, or may prompt the user before potentially switching.

Figure 3C:
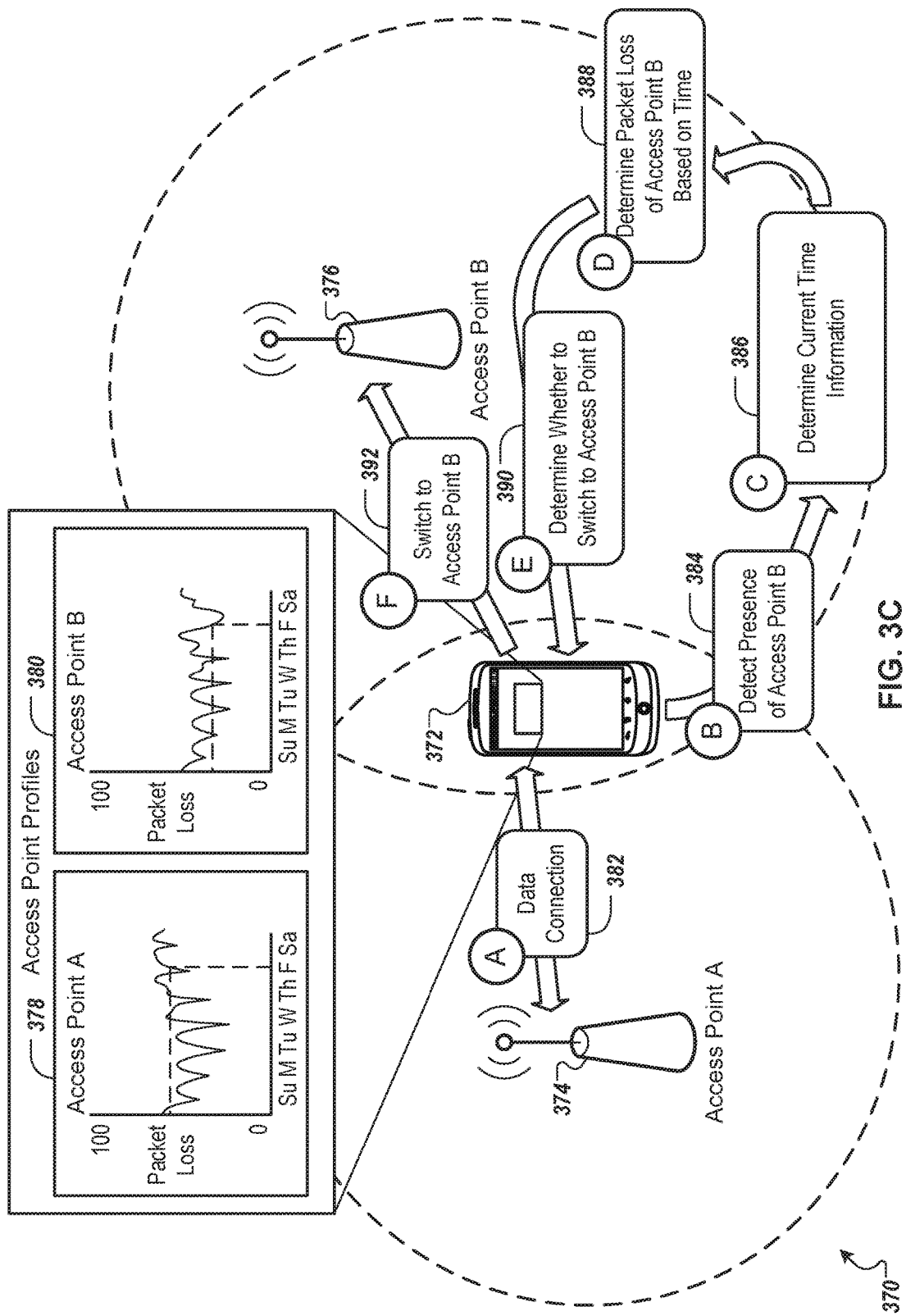

FIG. 3C depicts a conceptual diagram of an example system 370 for determining whether and when to switch a mobile computing device between wireless access points. Similar to the example systems 300 (shown in FIG. 3A) and 340 (shown in FIG. 3B), for example, the example system 370 includes a mobile computing device 372 (similar to the mobile computing devices 302 and 342), which can be employed by a user to send and receive data over various types of wireless networks. In the depicted example system 370, the mobile computing device 372 may presently be in range of (and may communicate with) an access point 374 (Access Point A, similar to access points 304 and 344) and an access point 376 ("Access Point B", similar to access points 306 and 346). Access Points A and B, for example, may each be associated with the same network, or may each be associated with different networks.

Like the mobile computing devices 302 and 342 described above, the mobile computing device 372 can maintain profiles for wireless access points with which it has previously communicated. In the depicted example in FIG. 3C, the profiles for the wireless access points can correlate, at least, time information (e.g., time of day, day of week) with rates of packet loss for the wireless access points. Such time information can be a passive indicator of network traffic and usage patterns for wireless access points, which can affect the quality of a connection with a wireless access point. For instance, during periods of time when a wireless access point is being used heavily with high levels of network traffic, a mobile computing device using the wireless access point can experience a higher rate of packet loss and, accordingly, a lower quality wireless connection.

Profiles for an access point can be generated by the mobile computing device 372 over time while the mobile computing device 372 is communicating with the access point. For example, the mobile computing device 372 can build and maintain a profile (e.g., a graph, a model, etc.) for an access point by periodically sampling the number of data packets lost, the number of data packets successfully transmitted, and one or more factors that may be related to data loss, such as the current date/time (e.g., as determined by a device and/or network clock), overall network traffic, the access point's signal strength, the device's location coordinates, etc. For each sampling interval, for example, the mobile computing device 372 can identify a packet loss percentage and a current time (and/or other relevant factors), and can update the access point's profile accordingly. In the depicted example system 370, the mobile computing device 372 may maintain an access point profile 378 for Access Point A, and a separate, different access point profile 380 for Access Point B, each profile including a graph of packet loss as a function of time. For implementations which consider additional factors (e.g., signal strength, location, network traffic, etc.), the mobile computing device 372 may maintain a multidimensional model for each access point.

In addition to depicting a conceptual diagram of the example system 370 for determining whether and when to switch a mobile computing device between wireless access points, FIG. 3C also illustrates an example flow of data within the system 370 during steps A to F. The steps A to F may occur in the illustrated sequence, or they may occur in a sequence that is different than in the illustrated sequence. For example, the steps A to F may be performed by the mobile computing device 372 in a variety of orders, and/or one or more steps may be performed concurrently.

As indicated by step A (382), the mobile computing device 372 can have a data connection with the access point 374 ("Access Point A"). Access Point A, for example, may be a cell tower maintained by a provider of a 3G or 4G data communication network, or may be another sort of access point. The mobile computing device 372 may use the network connection to send and receive data via the access point 374 during a user's web browsing session, for example.

As indicated by step B (384), the mobile computing device 372 can detect the presence of the access point 376 (Access Point B). Access Point B, for example, may be a WiFi access point (maintained by an entity such as a coffee shop, for example), or may be another sort of access point. For example, the user of the mobile computing device 372 may enter the coffee shop during his or her web browsing session, and the device may recognize Access Point B as being "in range" or otherwise available. The mobile computing device 372, for example, may include transceivers and/or sensors for detecting various access points as they become available (or unavailable).

In response to detecting the presence of the access point 376, the mobile computing device 372 can determine current time information, as indicated by step C (386). The current time information can be compared to the access point profile 380 and used to determine an estimated rate of packet loss for the wireless access point 376. The current time information can include any of a variety of appropriate information, such as a current time of day (e.g., 10:00 am), a day of the week (e.g., Monday), an indication of whether the current day is a work day (e.g., Monday-Friday) or non-work day (e.g., Saturday, Sunday, holiday), a current month (e.g., September), a time of year (e.g., fall, spring, summer, winter), or any combination thereof.

As indicated by step D (388), the mobile computing device 372 can determine an estimated rate of packet loss if it were to communicate with access point 376 (Access Point B), based on the current time (e.g., a time of the day, a time of the day for a particular day of the week) and/or other factors (e.g., signal strength, location) which may be related to packet loss. The access point profile 380, for example, may be locally stored (e.g., as a file, in a database, etc.) and may be accessed by the mobile computing device 372 using an identifier associated with Access Point B. In general, different access points may be associated with different rate of packet loss for a given time period (e.g., a particular hour, a particular day, a particular hour/day combination). For example, the user of the mobile computing device 372 may have visited the coffee shop on multiple occasions, and historical packet data loss information may be available as a function of time for different time periods. In general, a higher than average rate of packet loss may be associated with time periods in which an access point services many devices. Conversely, a lower than average rate of packet loss may be associated with time periods in which the access point services few devices. For example, the coffee shop's Access Point B may generally experience light traffic during Friday mornings, and may experience a lower than average rate of packet loss during such times. Upon determining current time information, for example, the mobile computing device 372 can refer to the access point profile 380 to identify an estimated rate of packet loss for Access Point B that is correlated with the current time period.

Moreover, other factors (e.g., signal strength, location, etc.) which may potentially be related to data loss (e.g., packet loss) may additionally be considered by the mobile computing device 372. For example, an access point profile which includes two or more factors (e.g., signal strength and/or location information, along with time information) that have been measured and mapped in relation to packet loss, may be used to determine an estimated rate of packet loss that a mobile computing device is likely to encounter when transmitting data via an access point. The mobile computing device 372, for example, may have previously measured and recorded signal strength information and time information while transmitting data via the access point 376 (Access Point B). In the present example, the mobile computing device 372 can use signal strength information passively collected by its transceiver and time information from its clock to reference the access point profile 380 and to determine an estimated rate of packet loss for the combination of signal strength and time. For a given signal strength, the estimated rate of packet loss that is likely to be encountered by the mobile computing device 372 when communicating with Access Point B, for example, may be higher during particular time periods, and may be lower at others.

As indicated by step E (390), the mobile computing device 372 can determine whether to switch to the access point 376 (Access Point B). For example, the mobile computing device 372 can determine whether the rate of packet loss it is likely to experience if it were to switch from using Access Point A to Access Point B is under a particular threshold. Although not depicted in FIG. 3C, the determination in step E (390) of whether to switch to using access point B (376) can additionally be based on budget information for accounts associated with access point A (374) and/or access point B (376), as described above with regard to FIGS. 1 and 2A-C.

As indicated by step F (392), in the depicted example the mobile computing device 372 switches to the access point 376 (Access Point B) based on the comparison of the estimated packet loss rate with the threshold packet loss rate value. In the present example, as the expected packet loss for Access Point B is determined to be under the particular threshold, the mobile computing device 372 can switch from using Access Point A (e.g., a 3G or 4G network cell tower) to using Access Point B (e.g., the coffee shop's WiFi access point). The mobile computing device 372, for example, may automatically switch access points and/or networks, or may prompt the user before potentially switching.

The use and measurement of different indicators of packet loss for wireless access points that are depicted in FIGS. 3A-C and described with regard to the mobile computing devices 302, 342, and 372 can be combined, as indicated above. For example, received signal strength (described above with regard to FIG. 3A) and location information (described above with regard to FIG. 3B) can be used in combination to determine an estimated rate of packet loss for a wireless access point. In another example, received signal strength (described above with regard to FIG. 3A) and time information (described above with regard to FIG. 3C) can be used in combination to determine an estimated rate of packet loss for a wireless access point. In another example, location information (described above with regard to FIG. 3B) and time information (described above with regard to FIG. 3C) can be used in combination to determine an estimated rate of packet loss for a wireless access point. In another example, received signal strength (described above with regard to FIG. 3A), location information (described above with regard to FIG. 3B), and time information (described above with regard to FIG. 3C) can be used in combination to determine an estimated rate of packet loss for a wireless access point. Other appropriate indicators of packet loss may also be used alone or in combination with the indicators of packet loss rate described above with regard to FIGS. 3A-C.

Figure 4:
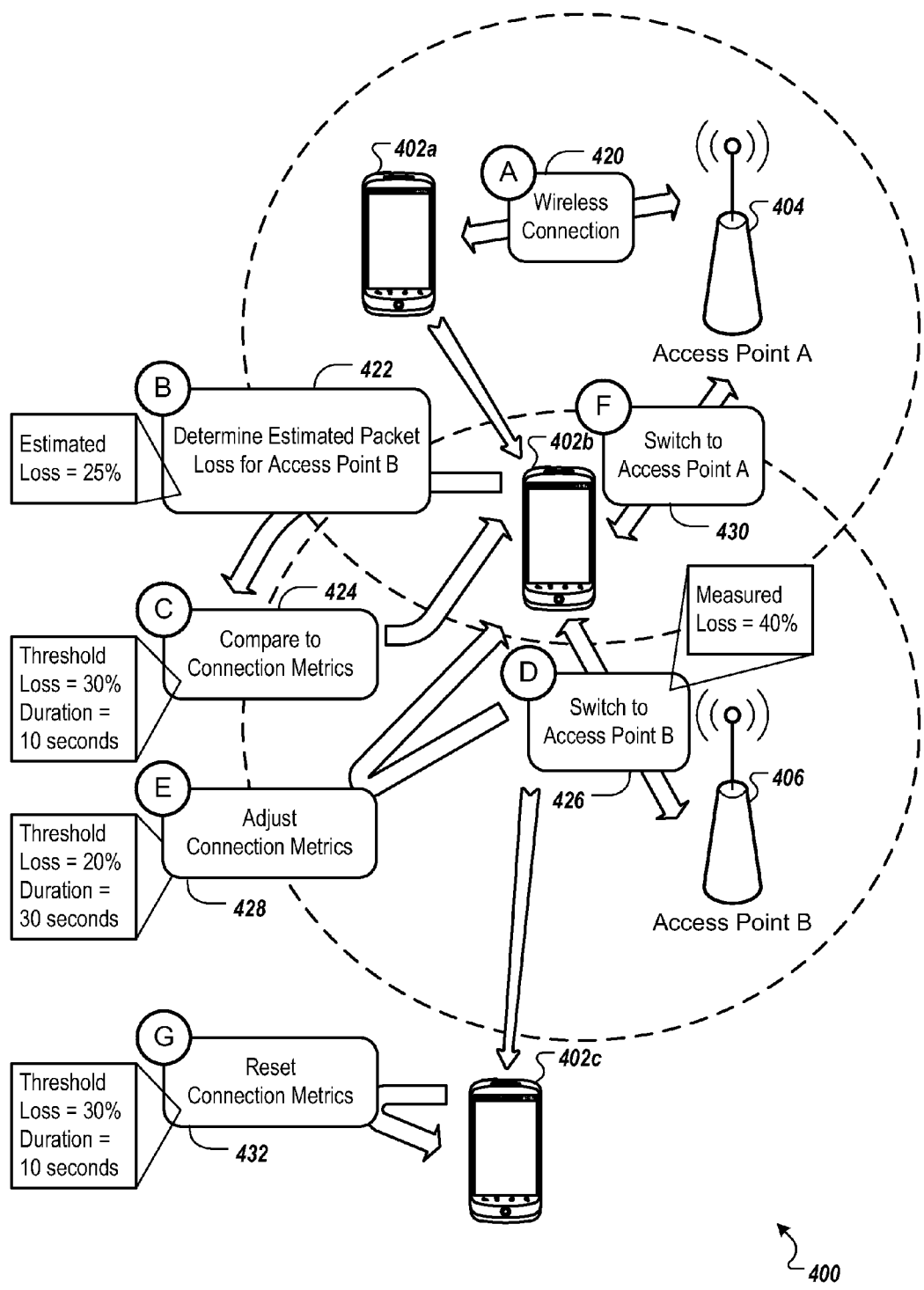
FIG. 4 depicts a conceptual diagram of an example system for adjusting connection metrics used to determine whether and when to switch a mobile computing device between wireless access points.

FIG. 4 depicts a conceptual diagram of an example system 400 for adjusting connection metrics used to determine whether and when to switch a mobile computing device between wireless access points. Similar to the example systems 300 (shown in FIG. 3A), 340 (shown in FIG. 3B), and 370 (shown in FIG. 3C), the example system 400 includes a mobile computing device 402 (similar to the mobile computing devices 302, 342, and 372), which can be employed by a user to send and receive data over various types of wireless networks. In the depicted example system 400, the mobile computing device 402 may move in and out of range of (and may communicate with) an access point 404 ("Access Point A", similar to access points 304, 344, and 374) and an access point 406 ("Access Point B", similar to access points 306, 346, and 376). Access Points A and B, for example, may each be associated with the same network, or may each be associated with different networks.

In general, when moving in and out of range of various access points, a mobile computing device may experience fluctuations in the rate of packet loss for an access point, particularly when the device is near the border of the access point's coverage. When actual and estimated packet loss is used as a factor in deciding whether and when to switch from one access point to another, such fluctuations may lead to "flapping" (frequent switching between two different access points and/or networks), and may lead to unstable network connections (e.g., internet connection), since a user's session may be interrupted during a network switch. To reduce the frequency of access point and/or network switching, adaptive thresholds may be used. When frequent switching between networks is detected, and/or when an encountered rate of packet loss for an access point is significantly higher than an expected rate, for example, a threshold value may be adjusted in terms of a maximum acceptable rate of packet loss (threshold rate of packet loss) and/or a time period over which an access point is required to continuously have a rate of packet loss that is less than or equal to the current maximum acceptable rate of packet loss (threshold time period), which can stabilize the device's network connection. For example, when two different sorts of networks are in range, the threshold rate of packet loss for connecting to a potentially unstable network (e.g., a WiFi network) may be reduced, thus favoring a historically stable network (e.g., a 3G or 4G mobile network). As another example, when a mobile computing device is roaming between access points for a common network, the threshold rate of packet loss for connecting to a potentially unstable access point (e.g., a poorly positioned access point) may be reduced, thus favoring a historically stable access point.

In addition to depicting a conceptual diagram of the example system 400 for adjusting connection metrics used to determine whether and when to switch a mobile computing device between wireless access points, FIG. 4 also illustrates an example flow of data within the system 400 during steps A to G. The steps A to G may occur in the illustrated sequence, or they may occur in a sequence that is different than in the illustrated sequence. For example, the steps A to G may be performed by the mobile computing device 402 in a variety of orders, and/or one or more steps may be performed concurrently.

As indicated by step A (420), the mobile computing device 402 (shown here at a first location as device 402a) can have a wireless connection with the access point 404 (Access Point A). Access Point A, for example, may be a cell tower maintained by a provider of a 3G or 4G data communication network, or may be another sort of access point. The mobile computing device 402a may use the wireless connection to send and receive data via the access point 404 during a user's web browsing session, for example.

In the present example, the mobile computing device 402 (shown here at a second location as device 402b) may move to a location that is in range of both access point 404 (Access Point A) and access point 406 (Access Point B). Access Point B, for example, may be a WiFi router, or may be another sort of access point. As indicated by step B (422), the mobile computing device 402b may determine an estimated rate of packet loss for Access Point B were the device 402 to switch from using Access Point A to using Access Point B. To estimate the rate of packet loss, for example, the mobile computing device 402b may use one or more passively measured data values (e.g., the signal strength of Access Point B, the device's geographic location, current time information) to reference Access Point B's profile. In the present example, the computing device 402b determines that the estimated rate of packet loss it is likely to experience if it were to switch to Access Point B is 25%.

As indicated by step C (424), the mobile computing device 402b may compare an estimated rate of packet loss to various connection metrics. In the present example, the mobile computing device 402b compares the estimated rate of packet loss (e.g., 25%) for Access Point B to a threshold rate of packet loss (e.g., 30%) for switching to Access Point B. Moreover, in the present example, the comparison is performed for a threshold period of time (e.g., 10 seconds). For example, the mobile computing device 402b can periodically (e.g., every fraction of a second, every second, every few seconds, etc.) sample one or more data values for various factors (e.g., signal strength, location, time) that have been correlated to packet loss in Access Point B's profile, and can determine a series of estimated packet loss rates for the threshold period of time. If all of the estimated packet loss rates in the series are under the threshold rate of packet loss (e.g., 30%), for example, the mobile computing device 402b may determine that the wireless access point 406 satisfies the connection metrics and is likely to have a high enough quality of connection to allow the device 402 to connect to the access point 406. As another example, the mobile computing device 402b may average each of the estimated packet loss rates in the series over the threshold period of time. If the average packet loss rate for the duration is under the threshold rate of packet loss (e.g., 30%), for example, the may determine that the wireless access point 406 satisfies the connection metrics and is likely to have a high enough quality of connection to allow the device 402 to connect to the access point 406.

In the present example, the mobile computing device 402b determines that the estimated packet loss rate (e.g., 25%) for switching to Access Point B is under the threshold (e.g., 30%) for Access Point B. As indicated by step D (426), the mobile computing device 402b switches from using the access point 404 (Access Point A) to using the access point 406 (Access Point B). However, in the present example, while the mobile computing device 402b communicates with Access Point B, it measures its actual rate of packet loss (e.g., 40%), and determined that it is higher than the threshold rate of packet loss (e.g., 30%). As the measured rate of packet loss may be considered as unsuitable for data communication, for example, the mobile computing device 402b may adjust its connection metrics and/or profile for Access Point B to reduce the frequency of switching between Access Points A and B.

As indicated by step E (428), the mobile computing device 402b may adjust its connection metrics for Access Point B. For example, the threshold packet loss rate and/or threshold period of time may be adjusted to reduce the inclination of the mobile computing device 402b to switch from a historically stable access point (e.g., Access Point A, which may be a cell tower for a 3G or 4G network) to a potentially unstable access point (e.g., Access Point B, which may be WiFi router that is currently experiencing problems based on its higher than expected rate of packet loss). In the present example, the mobile computing device 402b reduces Access Point B's threshold rate of packet loss (e.g., to 20%), and increases the threshold period of time (e.g., to 30 seconds) for determining whether sampled data values for one or more indicators of packet loss (e.g., signal strength, location, time) correlate to a rate of packet loss that is under the threshold rate of packet loss.

As indicated by step F (430), the mobile computing device 402b switches from using the access point 406 (Access Point B) to using the access point 404 (Access Point A) in response to the access point 406 no longer satisfying the adjusted threshold rate of packet loss for the threshold time period. In the present example, the mobile computing device 402b may remain in range of both Access Point A and Access Point B, and thus may potentially switch to Access Point B if its rate of packet loss were estimated as being under the adjusted threshold rate of packet loss (e.g., 20%) for the adjusted threshold period of time (e.g., 30 seconds). However, if the mobile computing device 402b were to connect to Access Point B, and were to encounter a rate of packet loss that is higher than the adjusted threshold (or some other target threshold, such as the original threshold), the device may again adjust the connection metrics for Access Point B to further reduce the inclination of the device to switch access points.

Although not depicted in FIG. 4, the determinations in step D (426) and/or step F (430) of whether to switch to between using access points A and B can additionally be based on budget information for accounts associated with access point A (404) and/or access point B (406), as described above with regard to FIGS. 1 and 2A-C.

In the present example, the mobile computing device 402 (shown here at a third location as device 402c) may move to a location that is out of range of the access point 406 (Access Point B), and/or an amount of time (e.g., an hour, a day, a week, etc.) may pass. As indicated by step G (432), after moving out of range of an access point for which its connection metrics have been adjusted and/or after the passage of a predetermined amount of time, the mobile computing device 402 may reset its connection metrics. In the present example, for Access Point B, the mobile computing device 402c resets its threshold packet loss rate to its original value (e.g., 30%), and resets its threshold period of time to its original value (e.g., 10 seconds). Thus, as shown in the present example and in previous examples, connection metric adjustments may be used as a technique for avoiding a potentially unstable access point (which may be a temporary condition), whereas access point profile adjustments may be used as a technique for identifying and refining stable and repeatable correlations between packet loss and one or more factors (e.g., signal strength, location, time, etc.).

Figure 5:
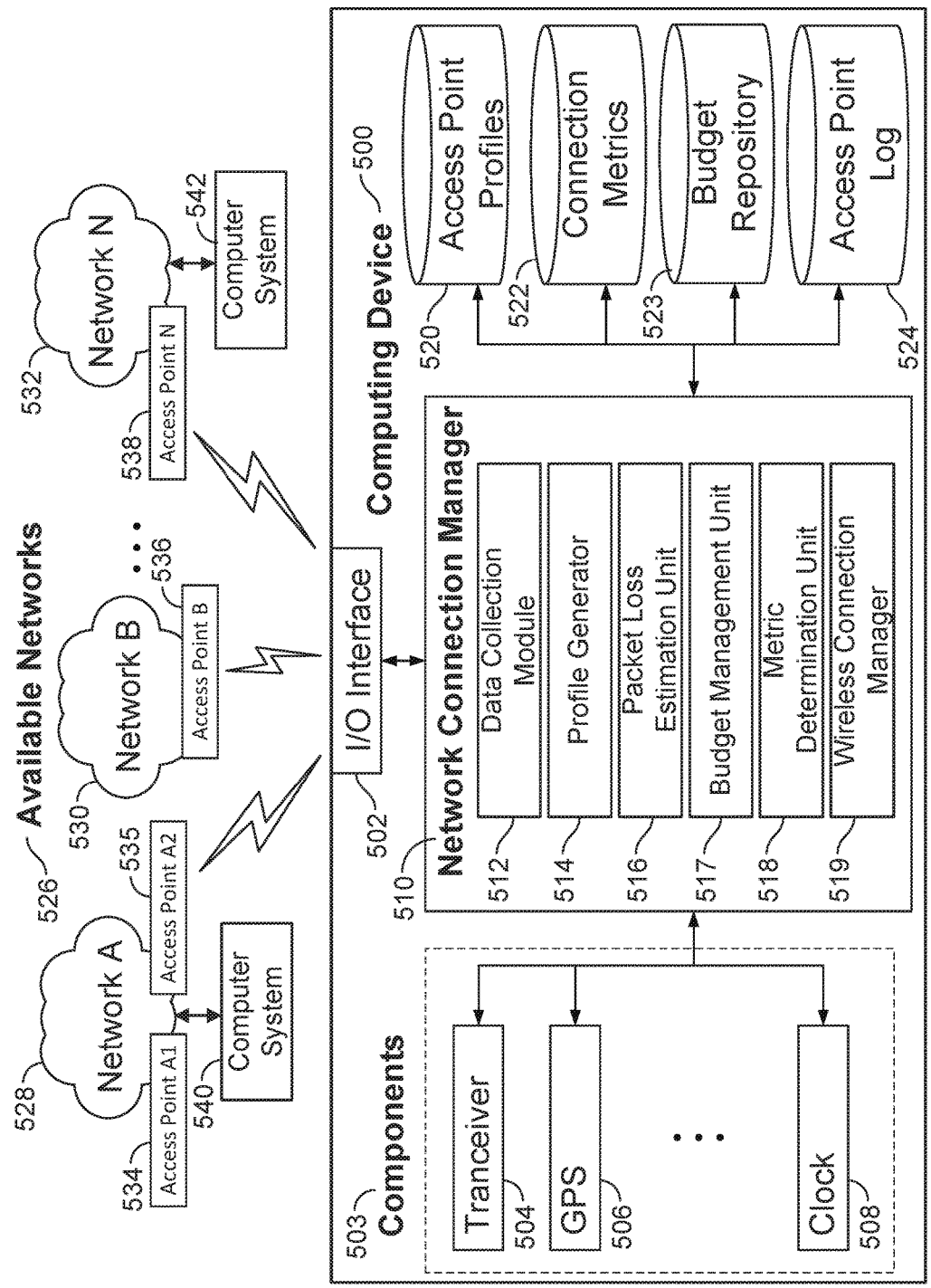
FIG. 5 depicts a system diagram of a computing device having a network connection manager interfacing with various data repositories, device components, and available network access points.

FIG. 5 is a system diagram of a computing device 500 that may be used to implement the systems and methods described in this document. The computing device 500 can be any of a variety of appropriate electronic devices, such as laptop computers, tablet computing devices, smartphones, cellular phones, personal digital assistants, media players, e-book readers, and other appropriate computing devices. The computing device 370 can be similar to the computing devices 302, 342, 372, and 402, described above with regard to FIGS. 3A, 3B, 3C, and 4, respectively.

The computing device 500 can include an input/output ("I/O") interface 502 that connects the computing device 500 to one or more of a plurality of available networks 526, such as Network A (528), Network B (530), and/or any other available network, as indicated by Network N (532). The I/O interface 502 can transmit data from the computing device 500 to available network(s) 526 and receive data on a computing device 500 from available network(s) 526. The I/O interface 502 can be a wired and/or wireless interface. For example, a wired I/O interface 502 can be any of a variety of interfaces including Ethernet, IEEE 1394, parallel port, PS/2, serial port, USB, VGA, Digital Visual Interface (DVI), and/or USB. Likewise, a wireless I/O interface 502 can be any of a variety of interfaces including an IEEE 802.11 WI-FI transceiver, a 3G radio transceiver, an LTE radio transceiver, a BLUETOOTH transceiver, and/or other appropriate wireless transceivers.

The computing device 500 can connect to one or more available networks 526 via the I/O interface 502. Network A (528), Network B (530), and Network N (532) represent a range of available networks 526 to which the computing device 502 may connect. The available networks 526 can include wired networks and/or wireless networks, such as local area networks ("LANs"), wireless area networks ("WANs"), and/or broadband wireless networks such as EDGE, CDMA, and/or LTE networks.

The computing device 500 can communicate with one or more device components 503. The components 503 may include one or more computer interfaces, including software, firmware, and/or hardware. The operation of one or more of the components 503 may include, to some extent, transmitting and/or receiving data over a network. Specific components 503 can include interfaces to a wireless transceiver 504, a GPS device 506, a system clock 508 (e.g., a device clock or network-based clock), and/or other appropriate device component interfaces.

The computing device 500 can also include various data repositories 520, 522, 524 that store information relevant to managing and establishing network connections. For example, one or more of the data repositories 520, 522, 524 can be stored in volatile memory media, such as a random access memory ("RAM") device, and/or the data repositories 520, 522, 524 can be stored in non-volatile memory media such as a compact disc ("CD"), DVD, hard-disk drive, FLASH memory, EPROM, EEPROM, magnetic disk drive, or holographic storage. The data repositories 520, 522, 524 may be stored locally on the computing device 500, in removable memory such as an SD card, and/or can be stored remotely, such as on a server.

An access point profiles data repository 520 can include information relating to various access points with which the computing device 500 may communicate. As described above with regard to FIGS. 3A-C, a separate, different access point profile may be maintained for each access point with which a mobile device has previously communicated, and each access point profile may include a mapping between data loss (e.g., packet loss) experienced during data transfer, and one or more other factors, such as signal strength, location, and time. Access point profiles, for example, may be implemented as graphs, multidimensional data models, or other suitable data structures.

A connection metrics data repository 522 can include information relating to connection metrics used by the computing device 500 when determining whether and when to connect to an access point. Connection metrics may include threshold values for rates of data loss (e.g. packet loss), threshold periods of time over which estimated rates of packet loss are sampled, sampling frequencies, and other suitable connection metrics. For example, the computing device 500 can access the connection metrics data repository 522 to identify a threshold rate of packet loss to be compared to an actual rate of packet loss as part of a process for deciding whether to switch away from a currently connected access point. As another example, the computing device 500 can access the connection metrics data repository 522 to identify a threshold rate of packet loss to be compared to an estimated rate of packet loss as part of a process for deciding whether to switch to an available (but currently unconnected) access point. Threshold periods of time for sampling and sampling frequencies, for example, may be used by the computing device 500 when collecting parameters which may be correlated to packet loss (e.g., signal strength, location, time, etc.), and may be used for generating profiles and/or determining rates of actual or estimated packet loss.

An access point log data repository 524 can include information relating to historical connections and communications with various access points by the computing device 500. For example, the computing device 500 may store information in the access point log data repository 524 such as a access point identifiers, connection start and end times, amount of data transferred during a communication session, data transfer rates, data loss rates, and other factors experienced during the communication session, such as signal strength, location, time, etc. While communicating with an access point, for example, the computing device 500 can periodically sample a rate of encountered packet loss and one or more other factors (e.g., signal strength, location, time), and can store the packet loss rate in the access point log data repository 524 in association with the one or more other factors and the access point's identifier. The computing device 500 can use the information for immediately or subsequently (e.g., based on an event such as threshold amount of information having been collected, the computing device 500 no longer being in the presence of a wireless access point for which information was collection, the device 500 being connected to an external source of power, and/or a threshold amount of available processing resources on the device 500) generating and/or updating access point profiles maintained by the access point profiles data repository 520.

The computing device 500 can also include a network connection manager 510 which can manage requests for network connections and can determine when and how to service the requests. For example, the network connection manager 510 may include one or more computer programs which may be software, firmware, and/or hardware. The network connection manager 510 can access information provided by the device components 503. In addition, the connection manager 510 can access stored data used in managing the establishment of connections from resources such as the access point profiles data repository 520, connection metrics data repository 522, and/or the access point log data repository 524.

The network connection manager 510 can include a data collection module 512, a profile generator 514, a packet loss estimation unit 516, a budget management unit 518, a metric determination unit 518, a wireless connection manager 519, or any combination thereof.

The data collection module 512 can be used by the computing device 500 to access data collected by one or more device components 503. The computing device 500 may use the wireless transceiver 504 to identify the signal strength of an access point, and to identify information such as data transfer rates and/or packet loss rates during a data communication session with the access point. The GPS device 506 may be used by the computing device 500 to identify the device's current geographic location coordinates, and the clock 508 may be used to identify current time information. Collected data may be provided to the access point log data repository 524, for example, and may be used for generating and/or updating access point profiles maintained by the access point profiles data repository 520. Moreover, data collected by the data collection module 512, such as signal strength, location, and/or time, may be used for estimating a rate of packet loss for a particular access point.

The profile generator 514 can be used by the computing device 500 for generating a separate, different profile for each access point with which it communicates. For example, the profile generator 514 can reference information collected by the data collection module 512 and stored by the access point log data repository 524 to generate and/or update a profile for a particular access point, maintained by the access point profiles data repository 520. In general, access point profiles may be based on data communication statistics (e.g., data transfer rates, data loss rates, etc.) and statistics for one or more correlated factors (e.g., signal strength, location, time, etc.), and may be may be implemented as graphs, multidimensional data models, or other suitable data structures.

The packet loss estimation unit 516 can be used by the computing device 500 for estimating a rate of packet loss which may be encountered when communicating with a particular access point, based on the access point's profile, and based on current data values for one or more factors which have been correlated with packet loss for the access point. To estimate the rate of packet loss for a packet loss for an access point, for example, the computing device 500 can receive from the data collection module 512 the access point's signal strength (e.g., passively determined by the wireless transceiver 504), the device's location (e.g., received from the GPS device 506 if the user has enabled the device), and/or the current time (e.g., received from the device's clock 508). The packet loss estimation unit 516, for example, can use the current data values for the various factors (e.g., signal strength, location, time, etc.) singly or in combination to reference the access point's associated profile and identify a correlated rate of packet loss for the access point.

The budget management unit 517 can be programmed to access budget information for one or more wireless data services that are provided by networks A-N (528-532) and their corresponding access points 534-538. The budget information can be obtained from the computer systems 540-542 that are associated with the networks A-N, and/or may be obtained from a budget repository 523 that is local to the computing device 500. The budget information can include a variety of details associated with one or more accounts (e.g., mobile data plans) that are used to access the wireless data services provided by the networks A-N and the access points 534-538, such as a quantity of use (e.g., quantity of data transmissions, amount of time) that is available for over a period time (e.g., one day, one week, one month), a portion of that quantity that has been consumed as of a current date, and/or information regarding supplemental budgets (e.g., additional 1 GB of data for $10) that are available if the current available budget is exceeded during the period of time. The budget management unit 517 can also generate, store, and access usage patterns for use of data services by the computing device 500. For instance, the computing device 500 can track use of the network A 528 by the computing device 500 and can generate a usage pattern for network A 528 which can provide an estimation of future use of network A 528 by the computing device 500. The usage patterns may also be stored in the budget repository 523. The budget management unit 517 can additionally determine whether the computing device 500 has a current budget deficit (e.g., more of an available budget has been spent as of a current time than expected based on a usage pattern) based on a comparison of the budget information and usage patterns for the computing device 500.

The metric determination unit 518 can be used by the computing device 500 to determine one or more metrics to be used for generating and/or updating access point profiles, and for determining whether and when to switch away from an access point to a different access point. For example, the metric determination unit 518 can access data maintained by the connection metrics data repository 522 to add, edit, and delete packet loss thresholds, sampling time periods, and sampling frequencies to be used by other device functions. As described above with regard to FIG. 4, for example, connection metrics such as packet loss thresholds and sampling durations may be adjusted for a particular access point to reduce the frequency of switching between access points and/or networks, thus stabilizing a device's network connection.

The wireless connection manager 519 can be used by the computing device 500 to switch from one access point to a different access point. The different access points, for example, may each be associated with a common network, or may be associated with different networks. The wireless connection manager 519, for example, may use data transfer protocols such as Transmission Control Protocol/Internet Protocol (TCP/IP) and User Datagram Protocol (UDP) to send and receive data over a wireless network via an access point, and may use an appropriate interface (e.g., a suitable radio device) for communication with the access point.

The networks A-N (528-532) can each include one or more wireless access points (e.g., cellular network towers, wireless transceivers, wireless routers, wireless range extenders/repeaters) from which wireless signals for the networks A-N (528-532) are transmitted and received. For instance, the networks A-N (528-532) are depicted in FIG.

5 as being associated with example access points 534-538. Each of the networks A-N (528-532) can be associated with (include) multiple access points.

The networks A-N (528-532) can also each be associated with computer systems that manage network access and use by client computing devices, such as the computing device 500. For example, the network A 528 is associated with a computer system 540 and the network N 532 is associated with computer system 542. The computer systems 540 and 542 can each include one or more computing devices, such as a desktop computer, a computer server, a distributed computing system (e.g., cloud computing system, networked computer servers), and/or other appropriate computing devices. Although not depicted, the network B 530 can be associated with a computer system similar to the computer systems 540 and 542.

The computer systems 540 and 542 can control access to the networks 528 and 532 by client computing devices, such as the computing device 500, through the access points 534, 535, and 538. The computer systems 540 and 542, for example, can each include access control units which instruct the access points 534, 535, and 538 to restrict access to only client computing devices which are currently authorized to use the networks 528 and 532, which may be indicated by various identifying information provided by the client computing devices, such as unique identifiers (e.g., MAC addresses, usernames) and/or authentication information (e.g., authorization credentials).

Figure 6A:
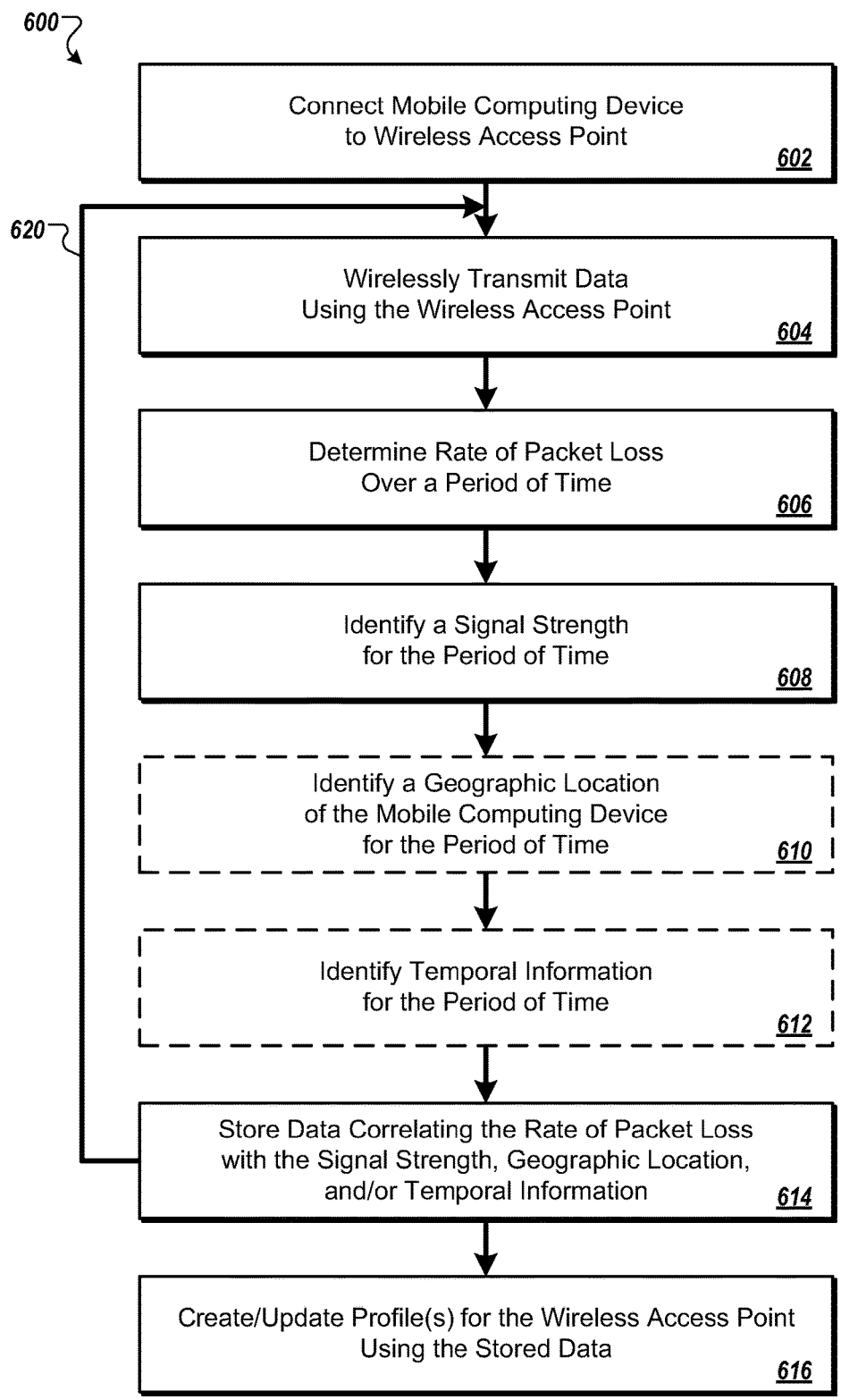
FIG. 6A is a flowchart of an example technique for creating and updating access point profiles.

FIG. 6A is a flowchart of an example technique 600 for creating and updating access point profiles. In various implementations, the technique 600 may be performed by the systems 300, 340, 370, 400, 500, and/or other systems not depicted, and will be described as being performed by the system 500 for the purpose of clarity. Briefly, the technique 600 includes collecting statistics for a wireless access point over a period of time. In general, the statistics may identify rates of data packet loss for the access point while communicating data with a mobile computing device, and may identify data values associated with one or more potentially correlated factors, such as received signal strengths for the access point, geographic locations for the mobile computing device, and current time values. The statistics may be collected at intervals, and may be used to generate at least a portion of a profile for the access point.

In further detail, at 602, a mobile computing device connects to a wireless access point. Referring to FIG. 5, for example, the computing device 500 may connect to the access point 536 ("Access Point B"). If the computing device 500 has not previously connected to Access Point B, for example, the computing device 500 may create or retrieve a default profile for the access point prior to connection, to be refined during a communication session with the access point. For example, the computing device 500 may have previously communicated with the access point 534 ("Access Point A1"), which may be similar to Access Point B (e.g., a similar model, a similar configuration, etc.). In the present example, the computing device 500 may use a copy of the profile for "Access Point A1" as a default profile for Access Point B. As another example, other devices that are similar to the computing device 500 may have previously communicated with Access Point B, and the computing device 500 may receive and use one of the profiles (or an average of multiple other profiles) as a default profile. Access point profiles may be stored by the computing device 500 in the access point profiles data repository 520, for example.

At 604, the mobile computing device wirelessly transmits data using the wireless access point. For example, the computing device 500 may transmit data to and receive data from the access point 536 (Access Point B) during an Internet browsing session, using the I/O interface 502 and the transceiver 504.

At 606, a rate of packet loss is determined over a period of time. For example, the computing device 500 can access the connection metrics data repository 522 to identify a period of time (e.g., a fraction of a second, a second, a few seconds, continually) for monitoring the number of data packets successfully transmitted and the number of data packets that are lost. As another example, the computing device 500 can access the connection metrics data repository to 522 to identify a particular number of data packet transfer attempts (e.g., a hundred, a thousand, etc.) to be monitored and measured, and the computing device 500 can measure the number of data packets that are successfully transmitted and lost for that number of attempts. Using the number of successful data packet transmissions and the number of lost data packets, for example, the computing device 500 can determine the rate of packet loss associated with the access point 536 (Access Point B).

At 608, a signal strength is identified for the period of time (or the number of packet transfer attempts). For example, the computing device 500 can access the data collection module 512 which can receive signal strength information from the transceiver 504 for the access point 536 (Access Point B). The computing device 500, for example, can access the connection metrics data repository 522 to identify a sampling frequency (e.g., a fraction of a second, a second, a few seconds, etc.) for periodically identifying the current signal strength of Access Point B as the device communicates with the access point.

At 610, in some implementations, a geographic location of the mobile computing device is identified for the period of time (or the number of packet transfer attempts). For example, the computing device 500 can access the data collection module 512 which can receive device location information from the GPS device 506. The computing device 500, for example, can access the connection metrics data repository 522 to identify a sampling frequency for periodically identifying the current location of the device, as the device communicates with the access point 536 (Access Point B).

At 612, in some implementations, temporal information is identified for the period of time (or the number of packet transfer attempts). For example, the computing device 500 can access the data collection module 512 which can receive temporal information from the clock 508. The computing device 500, for example, can identify a current time as the device communicates with the access point 536 (Access Point B). The time, for example, may be expressed in terms of a current time, a current week, a current day of the week, a current month, a current day of the month, and/or a current day of the year.

At 614, data correlating the rate of packet loss with the signal strength, geographic location, and/or temporal information is stored. For example, the computing device 500 can store the information in the access point log 524 as it is collected, or in batches. In some implementations, a volume-weighted exponential moving average model may be used for storing and/or updating statistics (e.g., packet loss, signal strength, location, time, etc.) used for generating access point profiles. Moving average models, for example, may reflect recent conditions and expire data that may be out of date. Exponential models, for example, may take a short amount of time for updating (relative to other sorts of models), and a relatively small amount of storage space, thus conserving processing power and memory on mobile devices. Volume-weighted models, for example, may assign different weights to different data points according to the number of data packets those data points are based on, thus improving accuracy for bursty transmission environments.

At 616, one or more profiles for the wireless access point is created or updated, using the stored data. For example, the computing device 500 can use the profile generator 514 to update the access point profiles stored in the access point profiles data repository 520, based on the measured statistical information stored in the access point log 524. In some implementations, updating access point profiles may be event driven. For example, the computing device 500 may update its profile for the access point 536 (Access Point B) periodically, based on a timer (e.g., every minute, every five minutes, every hour, etc.), at a time of low device usage (e.g., when the device is idle), or when disconnecting with the access point. In some implementations, updating access point profiles may be continuous. For example, the profile generator 514 may continually update Access Point B's profile, based on measured statistical information as the information is collected.

As shown by arrow 620, the example technique 600 may be iterative. During a data communication session with the access point 536 (Access Point B), for example, the computing device 500 can periodically collect, store, update, and process statistical information associated with the session.

Figure 6B:
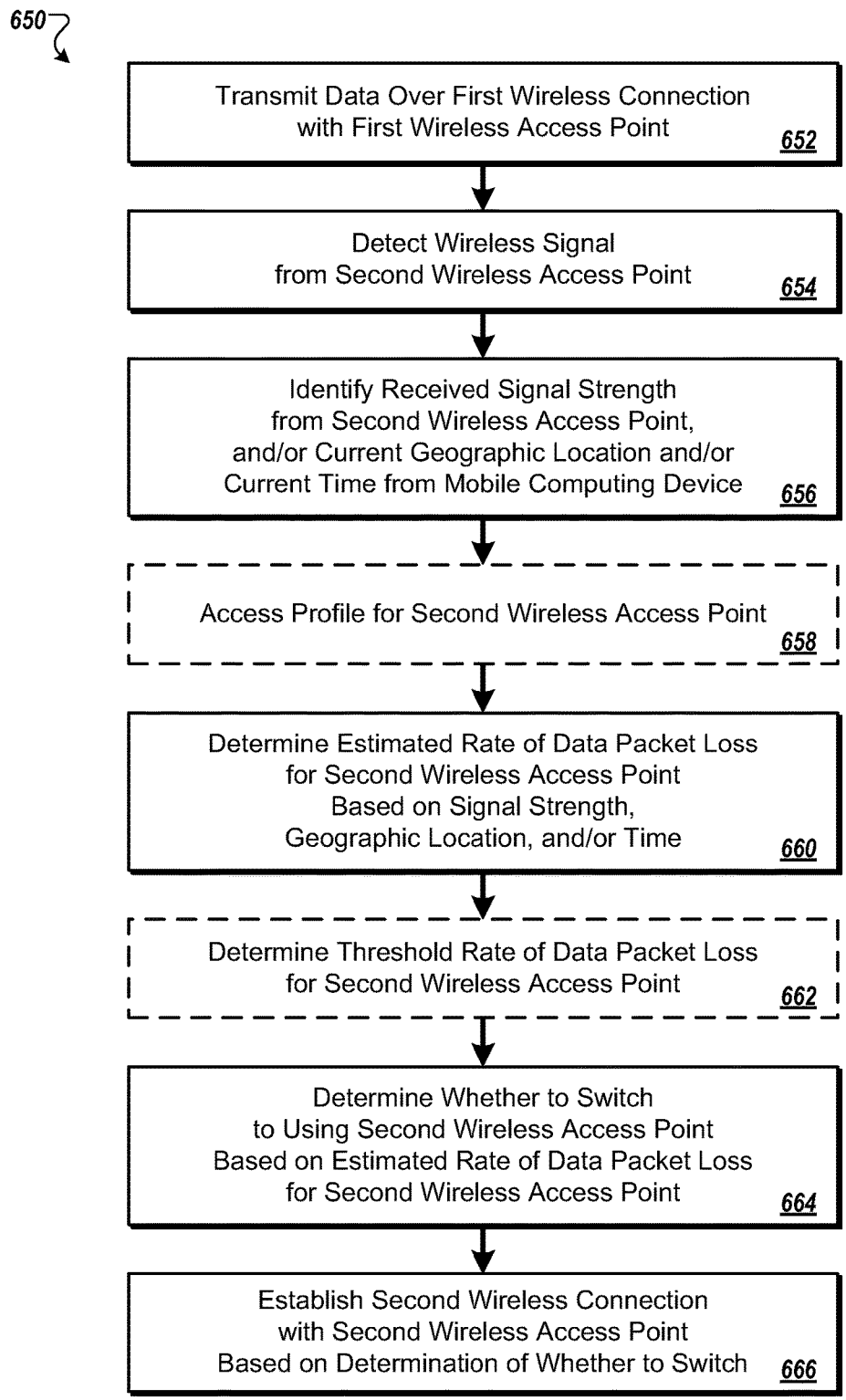
FIG. 6B is a flowchart of an example technique for determining whether and when to switch a mobile computing device between wireless access points.

FIG. 6B is a flowchart of an example technique 650 for determining whether and when to switch a mobile computing device between wireless access points. In various implementations, the technique 650 may be performed by the systems 300, 340, 370, 400, 500, and/or other systems not depicted, and will be described as being performed by the system 500 for the purpose of clarity. Briefly, the technique 650 includes transmitting data over a wireless connection with a first access point, detecting a signal from a second access point, identifying a received signal strength from the second access point (and/or other potentially relevant information), determining an estimated rate of packet loss for the second access point, and determining whether to switch to the second access point. In general, packet loss estimation may be based at least in part on data maintained in one or more access point profiles, which may be created and updated as discussed for example technique 600 (shown in FIG. 6A) above.

In general, the first and second access point may each be associated with the same wireless network, or may be associated with different wireless networks. For example, the first wireless access point may be part of a mobile data network and the second wireless access point may be part of a WiFi network. The mobile data network, for example, may be provided by a wireless carrier, and may include networks such as a 3G wireless network, a 4G Long Term Evolution (LTE) wireless network, and/or a 4G WiMAX wireless network. The mobile data network and the first wireless access point, for example, may be part of a fee-based network that charges users for access to the network. The WiFi network and the second wireless access point, for example, may be part of a free wireless that does not charge users for access to the network.

In further detail, at 652, a mobile computing device transmits data over a first wireless connection with a first wireless access point. Referring to FIG. 5, for example, the computing device 500 may transmit data over a wireless connection with the access point 535 ("Access Point A2") of the network 528 ("Network A") using the I/O interface 502. For example, a user may use the computing device 500 to send data to and/or receive data from a network or Internet server.

At 654, the mobile computing device detects a wireless signal from a second access point. For example, the computing device 500 may enter the range of the access point 536 (Access Point B) of the network 530 ("Network B"), or the access point 536 may otherwise become available. The computing device 500, for example, may detect the availability of Access Point B via its transceiver 504.

At 656, statistics associated with one or more factors that may be related to packet loss are identified, such as a received signal strength of the wireless signal from the second wireless access point, a current geographic location of the mobile computing device, and/or current time information, when the mobile computing device detects the wireless signal from the second access point. For example, the computing device 500 may use its data collection module 512 to periodically identify the signal strength of Access Point B via the transceiver 504, to periodically identify its current geographic location via the GPS device 506, and/or to periodically identify the current time via the clock 508. For an identified current time value, for example, the time may be expressed in terms of a current time, a current week, a current day of the week, a current month, a current day of the month, and/or a current day of the year. In some implementations, an average data value may be determined for one or more of the factors over a predetermined sampling period (e.g., a fraction of a second, a second, a few seconds, etc.). For example, an average signal strength may be identified for Access Point B and/or an average geographic location may be identified for the computing device 500 by averaging multiple identified data values, thus smoothing potential spikes in the data.

At 658, in some implementations, the mobile computing device may access a profile for the second wireless access point. For example, the computing device 500 can use an identifier for Access Point B to reference the access point profile for Access Point B, maintained by the access point profiles data repository 520. In general, the profile may correlate one or more factors (e.g., received wireless signal strength, mobile device geo location, temporal information, etc.) with rates of data packet loss for the second wireless access point. Various factors may be correlated with rates of data packet loss, for example, alone or in combination. For example, "Access Point B's" profile may correlate received wireless signal strengths for Access Point B with rates of packet loss for Access Point B. As another example, "Access Point B's" profile may correlate geographic locations at which Access Point B is located and received wireless signals strengths for Access Point B with rates of data packet loss for Access Point B. A particular location (e.g. a set of geo location coordinates, or a location relative to an access point location), for example, may be associated with a higher (or lower) rate of packet loss than another location, for a particular signal strength. As another example, "Access Point B's" profile may correlate time information and received wireless signal strengths for Access Point B with rates of data packet loss for Access Point B. For example, a particular time of the day, day of the week, week of the year, day of the month, month of the year, and/or day of the year may be associated with a higher (or lower) rate of packet loss than another time, for a particular signal strength. The access point profile for Access Point B, for example, may be implemented as a graph, a multidimensional data model, or another suitable data structure.

At 660, the mobile computing device determines an estimated rate of data packet loss for the second wireless access point based on one or more measured values, which may include the signal strength for the second wireless access point, the geographic location of the mobile device, and/or the current time. In general, the estimated rate of data packet loss may be determined without the mobile computing device having transmitted any data packets to the second wireless access point since the wireless signal from the second wireless access point was detected. For example, the computing device 500 can determine an estimated rate of data packet loss for Access Point B, based on empirical data collected for Access Point B (or based on empirical data collected for other access points of a similar model to Access Point B) which correlates signal strength to estimated data packet loss. By identifying a current signal strength value for Access Point B, for example, the computing device 500 may determine an estimated rate of data packet loss.

In some implementations, the estimated rate of data packet loss for the second wireless access point may be determined based on the profile for the access point. For example, the computing device 500 may refer to Access Point B's profile, which may include stored correlations between data packet loss and one or more factors, such as Access Point B's signal strength, the device's geographic location, and/or various time periods. The computing device 500 can provide the current signal strength for Access Point B, the current geographic location of the device, and/or the current time value to the packet loss estimation unit 516, which can use Access Point B's profile to identify an estimated rate of data packet loss it would likely encounter if it were to switch to using Access Point B, based on the current data values and the stored correlations, and without actively testing Access Point B, for example.

At 662, in some implementations, the mobile computing device determines a threshold rate of data packet loss for the second wireless access point. For example, the computing device 500 may access the connection metrics data repository 522 to identify a threshold rate of data packet loss for connecting to Access Point B. In some implementations, each access point to which a mobile computing device connects may be associated with different connection metrics. For example, the connection metrics for Access Point B may be adjusted to account for its overall data transfer rate and/or whether the access point is associated with a fee-based network or a free network.

At 664, a determination is made of whether to switch to using the second wireless access point to transmit data instead of the first wireless connection with the first wireless access point, based at least in part on the estimated rate of data packet loss for the second wireless access point. For example, the computing device 500 can determine whether to switch to Access Point B of "Network B" for transmitting data, or to continue transmitting data using Access Point A2 of "Network A". In some implementations, the determination of whether to switch to using the second wireless access point may be based on a comparison of the threshold rate of data packet loss and the estimated rate of data packet loss for the second wireless access point. For example, if the estimated rate of data packet loss for Access Point B is less than the threshold rate for Access Point B, the computing device 500 may decide to switch to Access Point B. However, if the estimated rate of data packet loss for Access Point B is greater than the threshold rate for Access Point B, the computing device 500 may decide to continue using Access Point A2.

In some implementations, the threshold rate of packet loss may be determined based on whether a connection with the second wireless access point was previously avoided when a connection with the second wireless access point was available. For example, the computing device 500 may have previously connected to Access Point B and encountered a rate of packet loss that was significantly (e.g., 10%, 20%, 50%, etc.) higher than the estimated rate of packet loss. If the encounter was recent (e.g., 10 minutes ago, an hour ago, four hours ago, a day ago, etc.), for example, the computing device 500 may temporarily lower the threshold data loss rate for Access Point B to reduce the likelihood that it may switch to Access Point B and again encounter a high rate of packet loss.

In some implementations, the threshold rate of data packet loss may be determined based on whether the mobile computing device has switched between using the first wireless connection with the first wireless access point and the second wireless connection with the second wireless access point at least a threshold number of times within a period of time. For example, the computing device 500 can use the metric determination unit 518 to access the connection metrics data store 522 to identify connection metrics for Access Point B. The computing device 500, for example, may have previously switched from using Access Point A2 to using Access Point B (and may have subsequently returned to Access Point A2) one or more times (e.g., once, twice, three times, etc.) within a particular period of time (e.g., a minute, ten minutes, an hour, etc.). In the present example, the computing device 500 may adjust the thresholds for one of the access points to dissuade frequent switching between the two.

In some implementations, the determination of whether to switch to using the second wireless access point may be based at least in part on a current rate of data packet loss for the first wireless access point. For example, the computing device 500 may compare the current rate of data packet loss for the currently connected Access Point A2 to the estimated rate of data packet loss for the unconnected Access Point B. If the estimated rate of packet loss for Access Point B is less than the rate of packet loss for Access Point A2, for example, the computing device 500 may switch to using Access Point B. However, if multiple available access points are associated with different characteristics, such as different overall data transmission rates and/or costs, such factors may be considered in addition to data packet loss.

At 666, the mobile computing device establishes a second wireless connection with the second wireless access point, based on the determination of whether to switch to using the second wireless access point. For example, the computing device may use the wireless connection manager 519 to switch from using Access Point A2 to using Access Point B. The computing device 500, for example, may automatically switch access points and/or networks, or may prompt the user before potentially switching.

Figure 7:
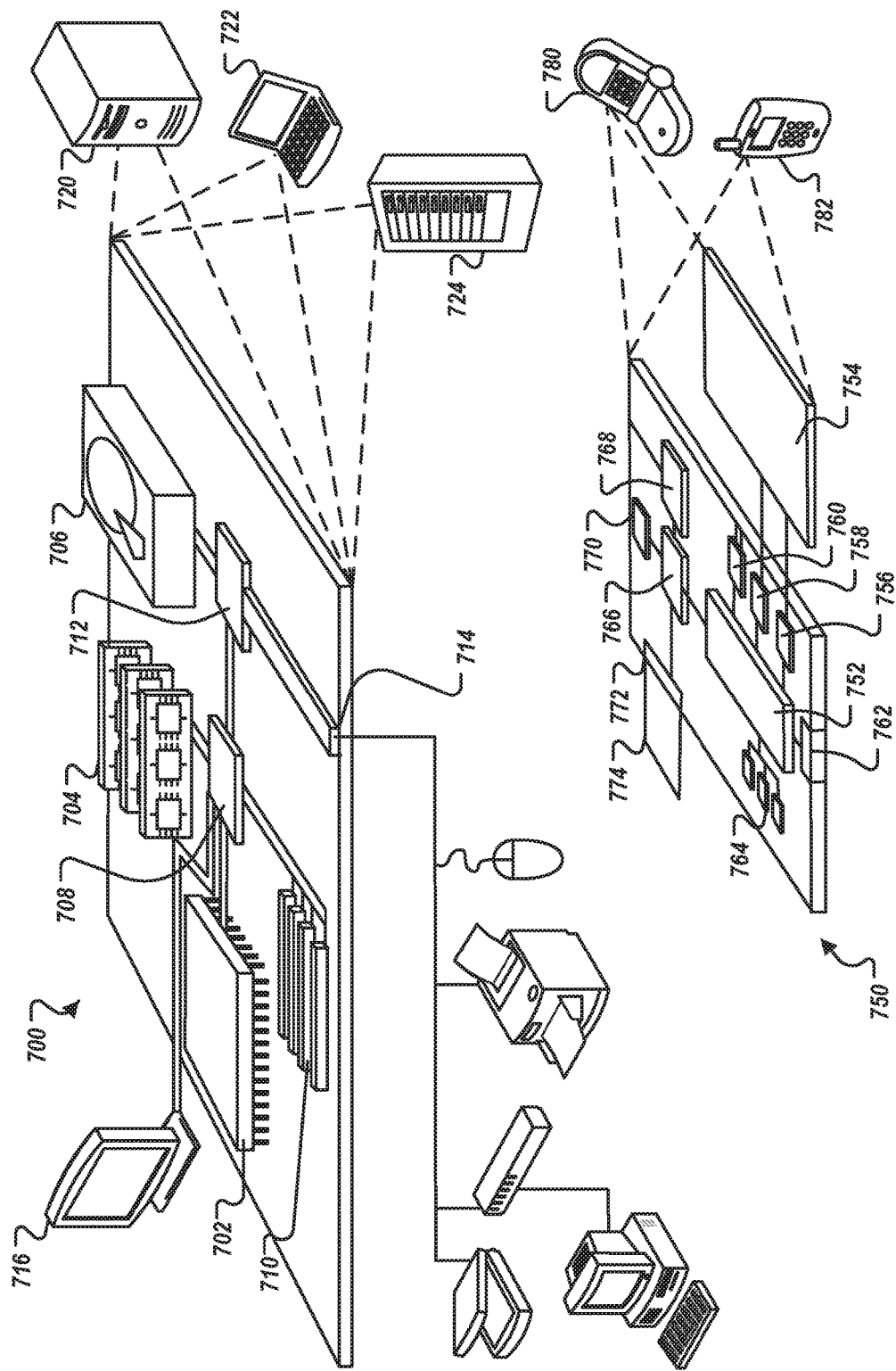
FIG. 7 shows an example of a computer device and a mobile computer device that can be used to implement the techniques described herein.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:

transmitting, by a computing device, data over a first wireless connection with a first wireless access point during a data communication session;

detecting, by the computing device, a wireless signal from a second wireless access point while the computing device is transmitting data over the first wireless connection with the first wireless access point during the data communication session;

in response to detecting the wireless signal from the second wireless access point, determining, by the computing device, whether an account of the computing device is currently running or is likely to run a deficit relative to a budget, wherein the budget corresponds to an amount of data that is available for transmission over a period of time;

in response to detecting the wireless signal from the second wireless access point, determining, by the computing device, whether an estimated level of data packet loss for the second wireless access point is greater than or equal to a threshold level of data packet loss, wherein the estimated level of data packet loss being greater than or equal to the threshold level of data packet loss indicates that a second wireless connection with the second wireless access point has at least a threshold likelihood of being a low quality connection;

based on (i) when the estimated level of data packet loss is determined to be greater than or equal to the threshold level of data packet loss and (ii) whether the account of the computing device is currently running or is likely to run the deficit relative to the budget, determining, by the computing device, that the computing device should switch from the first wireless connection with the first wireless access point to the second wireless connection with the second wireless access point; and establishing, by the computing device, the second wireless connection as a result of the determining that the computing device should switch from transmitting data over the first wireless connection with the first wireless access point to the second wireless connection with the second wireless access point.

2. The computer-implemented method of claim 1, wherein the first wireless access point and the second wireless access point are part of different wireless networks.

3. The computer-implemented method of claim 2, wherein the first wireless access point is part of a mobile data network and the second wireless access point is part of a WiFi network.

4. The computer-implemented method of claim 3, wherein the mobile data network includes one or more of: a 3G wireless network, a 4G long term evolution (LTE) wireless network, and a 4G WiMAX wireless network.

5. The computer-implemented method of claim 2, wherein the first wireless access point is part of a fee-based wireless network that charges users for access to the fee-based wireless network and the second wireless access point is part of a free wireless network that does not charge users for access to the free wireless network.

6. The computer-implemented method of claim 1, further comprising:
identifying, by the computing device, connection information that describes one or more parameters associated with a potential wireless connection with the second wireless access point;
determining, by the computing device and without the computing device transmitting data packets to the second wireless access point after detecting the wireless signal, a quality indicator for the second wireless access point based on the connection information, wherein the quality indicator indicates an estimated level of quality associated with the potential wireless connection with the second wireless access point; and
wherein the determination of whether to switch from the first wireless connection to the second wireless connection is further based on the quality indicator.

7. The computer-implemented method of claim 6, wherein the connection information comprises a received signal strength of the wireless signal from the second wireless access point.

8. The computer-implemented method of claim 7, further comprising:
accessing, by the computing device for the second wireless access point, a profile that correlates received wireless signal strengths for the second wireless access point with quality indicators for the second wireless access point; and
wherein the quality indicators for the second wireless access point are determined based on the profile for the second wireless access point.

9. The computer-implemented method of claim 8, further comprising:
collecting, by the computing device over a second period of time before the computing device transmits data over the first wireless connection with the first wireless access point, statistics for the second wireless access point, wherein the statistics identify the quality indicators and received signal strengths for the second wireless access point at intervals during the second period of time; and
generating at least a portion of the profile for the second wireless access point using the collected statistics.

10. The computer-implemented method of claim 6, further comprising:
identifying, by the computing device, a current geographic location of the computing device; and
wherein the connection information comprises the current geographic location.

11. The computer-implemented method of claim 6, further comprising:
identifying, by the computing device, current time information when the computing device detects the wireless signal from the second wireless access point, wherein the time information includes one or more of: a current time, a current week, a current day of the week, a current month, a current day of the month, and a current day of the year; and
wherein the connection information comprises the current time information.

12. The computer-implemented method of claim 6, wherein the quality indicator comprises the estimated level of data packet loss for the second wireless access point that is determined based on the connection information.

13. The computer-implemented method of claim 1, further comprising:
determining, by the computing device, a likely quality level of communication with the second wireless access point; and
wherein determining that the computing device should switch from the first wireless connection with the first access point to the second wireless connection with the second wireless access point is further based on a determination of the likely quality level of communication with the second wireless access point.

14. The computer-implemented method of claim 1, wherein establishing the second wireless connection further comprises:
prompting, by the computing device, a user for input or consent before establishing the second wireless connection as a result of the determining that the computing device should switch from the first wireless connection with the first wireless access point to the second wireless connection with the second wireless access point; and
establishing, by the computing device, the second wireless connection based on the input or consent from the user.

15. A computer-implemented method comprising:
transmitting, by a computing device, data over a first wireless connection with a first wireless access point during a data communication session;
detecting, by the computing device, a wireless signal from a second wireless access point while the computing device is transmitting data over the first wireless connection with the first wireless access point during the data communication session;
in response to detecting the wireless signal from the second wireless access point, determining, by the computing device, whether at least a portion of a budget for an account of the computing device is currently available for use, wherein the budget corresponds to an amount of data that is available for transmission over a period of time;

in response to detecting the wireless signal from the second wireless access point, determining, by the computing device, whether an estimated level of data packet loss for the second wireless access point is greater than or equal to a threshold level of data packet loss, wherein the estimated level of data packet loss being greater than or equal to the threshold level of data packet loss indicates that a second wireless connection with the second wireless access point has at least a threshold likelihood of being a low quality connection;

based on (i) when the estimated level of data packet loss is determined to be greater than or equal to the threshold level of data packet loss and (ii) whether the at least the portion of the budget is currently available for use, determining, by the computing device, that the computing device should switch from the first wireless connection with the first wireless access point to the second wireless connection with the second wireless access point; and establishing, by the computing device, the second wireless connection as a result of the determining that the computing device should switch from transmitting data over the first wireless connection with the first wireless access point to the second wireless connection with the second wireless access point.

16. The computer-implemented method of claim 15, wherein:
when none of the budget is determined to currently be available for use by the computing device, determining, by the computing device, that the computing device should switch from using the first wireless connection to using the second wireless connection; and
establishing, by the computing device, the second wireless connection in response to the determination to switch from using the first wireless connection to using the second wireless connection.

17. The computer-implemented method of claim 15, wherein the first wireless access point is part of a fee-based wireless network that charges users for access to the fee-based wireless network and the second wireless access point is part of a free wireless network that does not charge users for access to the free wireless network.

18. The computer-implemented method of claim 15, further comprising:
determining, by the computing device, a likely quality level of communication with the second wireless access point; and
wherein determining that the computing device should switch from the first wireless connection with the first access point to the second wireless connection with the second wireless access point is further based on a determination of the likely quality level of communication with the second wireless access point.

19. A computing device comprising:
a wireless network interface that is programmed to transmit data over a first wireless connection with a first wireless access point during a data communication session, to detect a wireless signal from a second wireless access point while transmitting data over the first wireless connection with the first wireless access point during the data communication session;
in response to detecting the wireless signal from the second wireless access point, a budget management unit that is programmed to access a budget repository and to determine whether an account of the computing device is currently running or is likely to run a deficit relative to a budget, wherein the budget corresponds to an amount of data that is available for transmission over a period of time;
in response to detecting the wireless signal from the second wireless access point, a packet loss estimation unit that is programmed to determine whether an estimated level of data packet loss for the second wireless access point is greater than or equal to a threshold level of data packet loss, wherein the estimated level of data packet loss being greater than or equal to the threshold level of data packet loss indicates that a second wireless connection with the second wireless access point has at least a threshold likelihood of being a low quality connection;
based on (i) when the estimated level of data packet loss is determined to be greater than or equal to the threshold level of data packet loss and (ii) whether the account of the computing device is currently running or is likely to run the deficit relative to the budget, a determination unit that is programmed to determine that the computing device should switch from transmitting data over the first wireless connection with the first wireless access point to the second wireless connection with the second wireless access point; and
a wireless connection manager that is programmed to establish the second wireless connection based on the determination by the determination unit.

20. The computing device of claim 19, wherein the first wireless access point is part of a fee-based wireless network that charges users for access to the fee-based wireless network and the second wireless access point is part of a free wireless network that does not charge users for access to the free wireless network.

21. The computing device of claim 19, wherein the wireless network interface is further programmed to identify a received signal strength, at the computing device, of the wireless signal from the second wireless access point; and
wherein the packet loss estimation unit is further programmed to determine the estimated level of data packet loss for the second wireless access point based on the signal strength for the second wireless access point, wherein the estimated level of data packet loss is determined without the computing device having transmitted any data packets to the second wireless access point since the wireless signal from the second wireless access point was detected.

22. The computing device of claim 19, wherein:
the packet loss estimation unit is further programmed to determine a likely quality level of communication with the second wireless access point; and
the determination unit is further programmed to determine whether to switch from transmitting data over the first wireless connection to the second wireless connection based on a determination of the likely quality of level of communication with the second wireless access point.

23. A computer-implemented method in which data is transmitted over a first wireless connection by a computing device with a first wireless access point during a data communication session comprising:
detecting, by a server, a wireless signal from a second wireless access point for the computing device while data is transmitted over the first wireless connection by the computing device with the first wireless access point during the data communication session;
in response to detecting the wireless signal from the second wireless access point, determining, by the server, whether an account of the computing device is currently running or is likely to run a deficit relative to a budget, wherein the budget corresponds to an amount of data that is available for transmission over a period of time;

in response to detecting the wireless signal from the second wireless access point, determining, by the server, whether an estimated level of data packet loss for the second wireless access point is greater than or equal to a threshold level of data packet loss, wherein the estimated level of data packet loss being greater than or equal to the threshold level of data packet loss indicates that a second wireless connection with the second wireless access point has at least a threshold likelihood of being a low quality connection; and based on (i) when the estimated level of data packet loss is determined to be greater than or equal to the threshold level of data packet loss and (ii) whether the account of the computing device is currently running or is likely to run the deficit relative to the budget, determining, by the server, that the computing device should switch from the first wireless connection with the first wireless access point to the second wireless connection with the second wireless access point.

* * * * *